(12) United States Patent
Greiner et al.

(10) Patent No.: US 12,055,738 B2
(45) Date of Patent: Aug. 6, 2024

(54) PARTIALLY ETCHED PHASE-TRANSFORMING OPTICAL ELEMENT

(71) Applicant: II-VI Delaware, Inc., Wilmington, DE (US)

(72) Inventors: Christoph M. Greiner, Eugene, OR (US); Jianji Yang, Eugene, OR (US); Dmitri Iazikov, Eugene, OR (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 17/934,710

(22) Filed: Sep. 23, 2022

(65) Prior Publication Data

US 2023/0010858 A1 Jan. 12, 2023

Related U.S. Application Data

(62) Division of application No. 16/802,339, filed on Feb. 26, 2020, now Pat. No. 11,487,053.

(60) Provisional application No. 62/855,885, filed on May 31, 2019, provisional application No. 62/810,834, filed on Feb. 26, 2019.

(51) Int. Cl.
*G02B 5/18* (2006.01)
(52) U.S. Cl.
CPC ......... *G02B 5/1861* (2013.01); *G02B 5/1871* (2013.01)

(58) Field of Classification Search
CPC .. G02B 5/1861; G02B 5/1871; G02B 5/1809; G02B 5/1876; G02B 2005/1804; G02B 5/1814–1819; G02B 5/1866; G02B 5/188; G02B 5/1885; G02B 1/118
USPC .......... 359/570, 571, 573, 575, 576
See application file for complete search history.

(56) References Cited

U.S. PATENT DOCUMENTS

| 5,742,433 | A | 4/1998 | Shiono et al. |
| 7,019,904 | B2 | 3/2006 | Shiozaki et al. |
| 7,142,363 | B2 | 11/2006 | Sato et al. |
| 7,688,512 | B2 | 3/2010 | Kittaka et al. |

(Continued)

FOREIGN PATENT DOCUMENTS

| EP | 1783520 A2 | 5/2007 |
| WO | 2016168093 A1 | 10/2016 |

*Primary Examiner* — Kimberly N. Kakalec
(74) *Attorney, Agent, or Firm* — Blank Rome LLP

(57) ABSTRACT

An optical element includes a substrate, an intermediate layer, a topmost layer, and a contiguous multitude of recessed and non-recessed areal regions. The intermediate layer is formed over a top surface of the substrate and has a refractive index $n_I$. The topmost layer is formed directly on the intermediate layer and has a refractive index $n_T$ where $n_T \neq n_I$. The intermediate and topmost layers are substantially transparent over an operational wavelength range that includes a design wavelength $\lambda_0$. A subset of areal regions has a largest transverse dimension less than about $\lambda_0$. Each non-recessed areal region includes corresponding portions of the intermediate and topmost layers. Each recessed areal region extends entirely through the topmost layer and at least partly through the intermediate layer. A fill medium fills the recessed areal regions. The areal regions are variously sized and distributed transversely across the optical element.

12 Claims, 15 Drawing Sheets

(56) References Cited

U.S. PATENT DOCUMENTS

| | | |
|---|---|---|
| 8,040,607 B2 | 10/2011 | Miller |
| 8,165,436 B2 | 4/2012 | Mossberg et al. |
| 8,989,537 B2 | 3/2015 | Mossberg et al. |
| 9,618,664 B2 | 4/2017 | Mossberg et al. |
| 2009/0116790 A1 | 5/2009 | Mossberg et al. |
| 2015/0090862 A1* | 4/2015 | Matsui ................ G02B 5/1876 359/356 |
| 2016/0306167 A1 | 10/2016 | Mossberg et al. |
| 2017/0168202 A1 | 6/2017 | Mossberg et al. |
| 2018/0128948 A1 | 5/2018 | Iazikov et al. |
| 2019/0212479 A1 | 7/2019 | Iazikov et al. |

\* cited by examiner

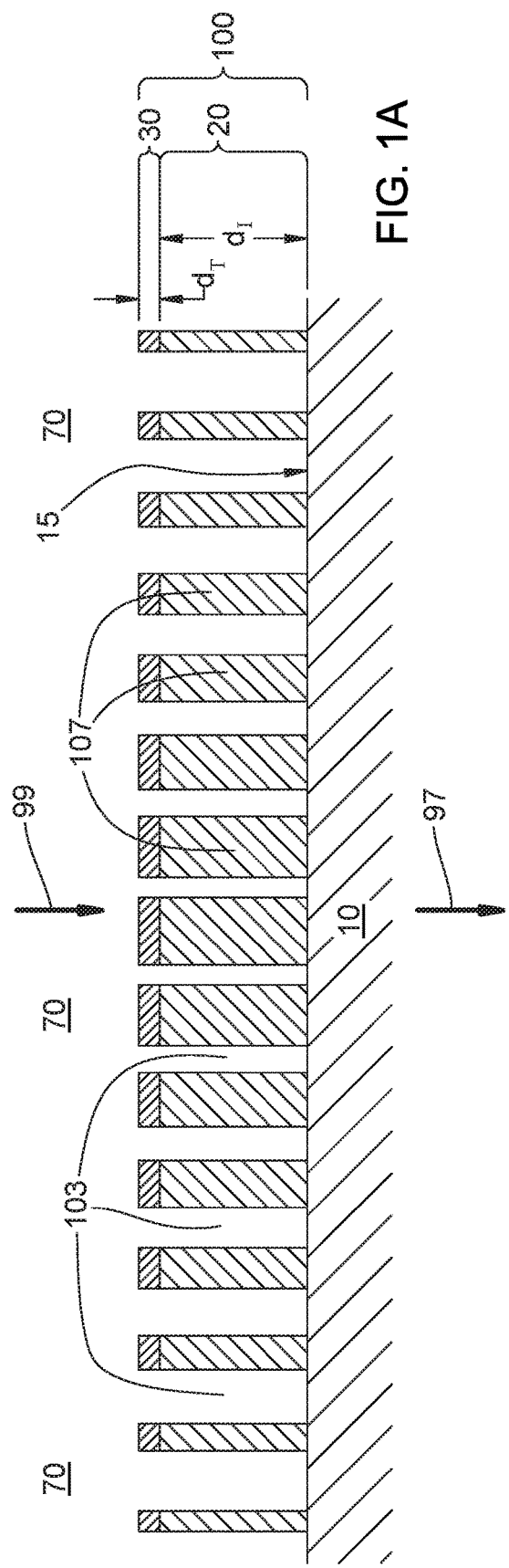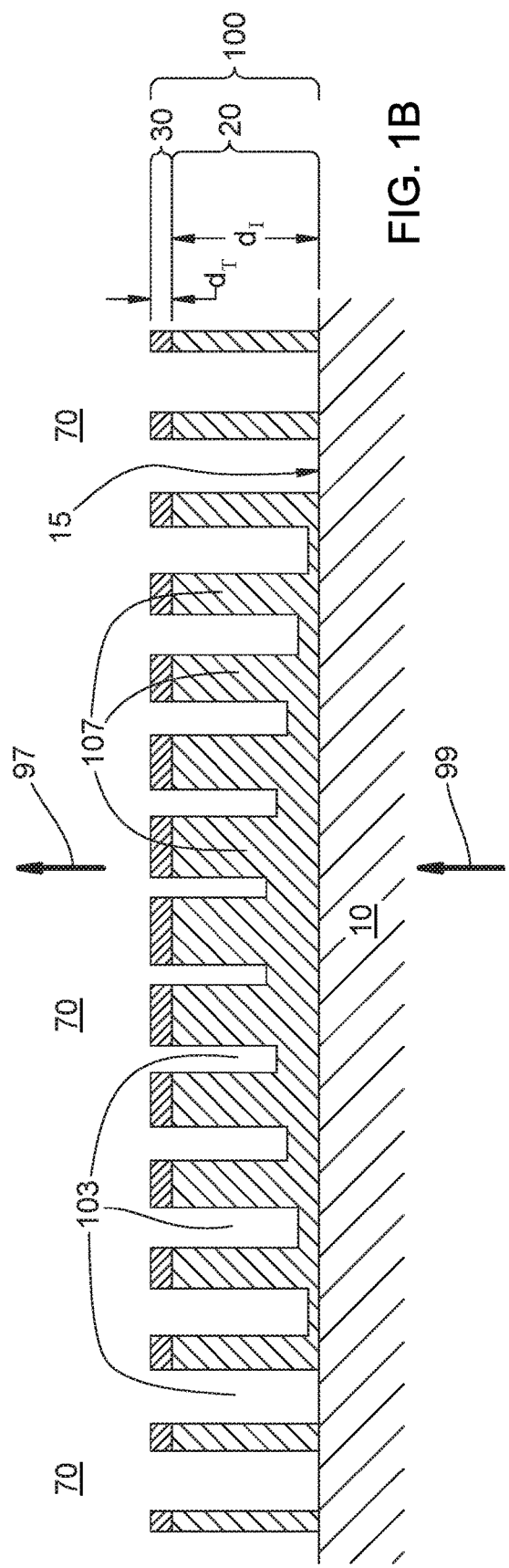

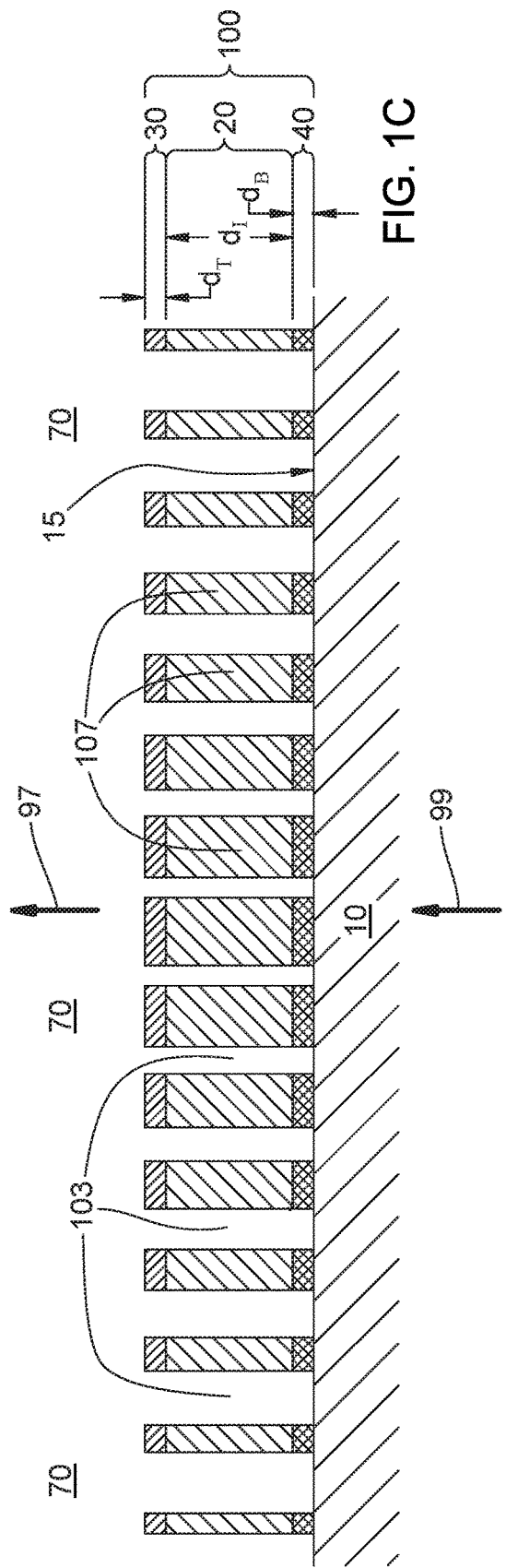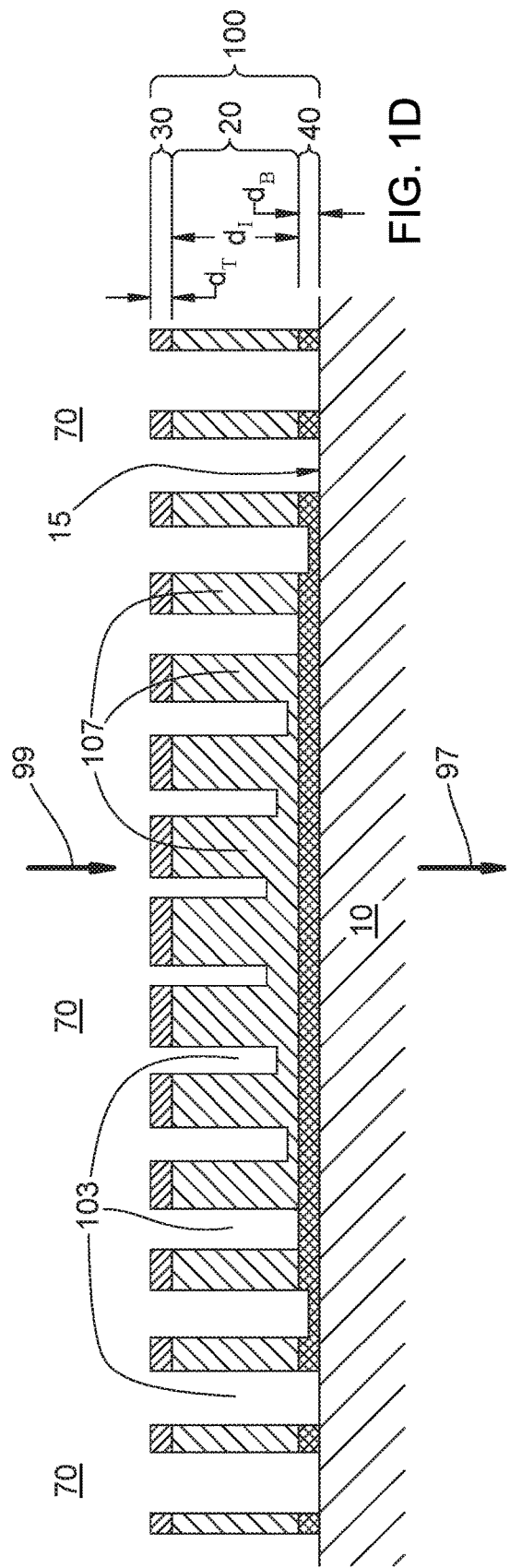

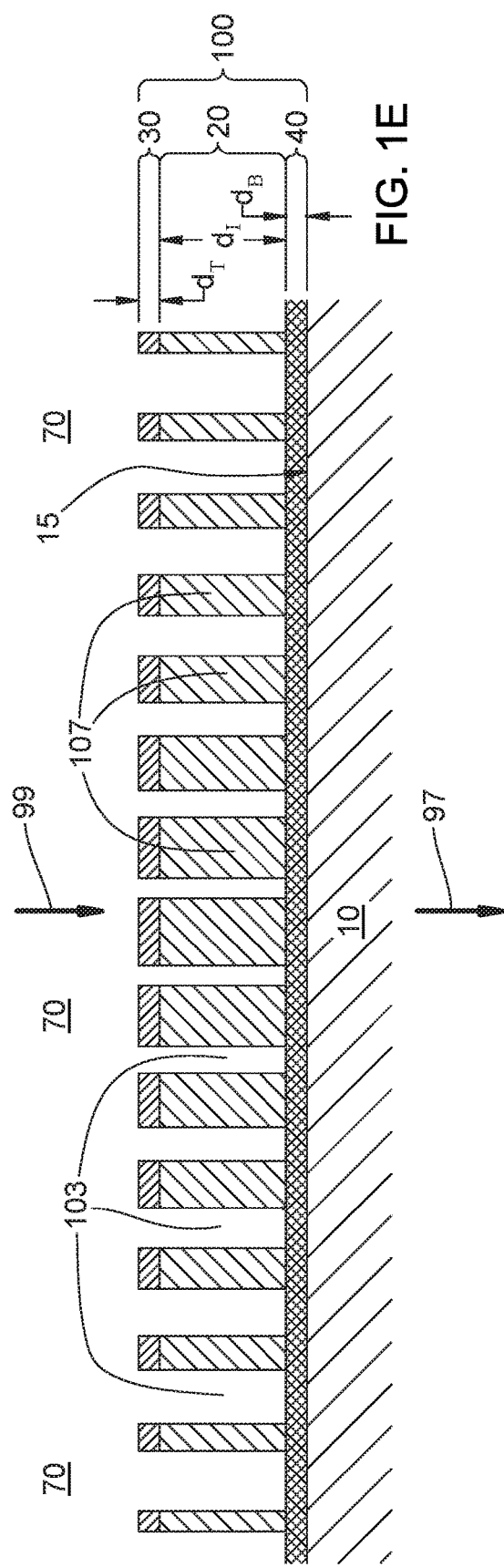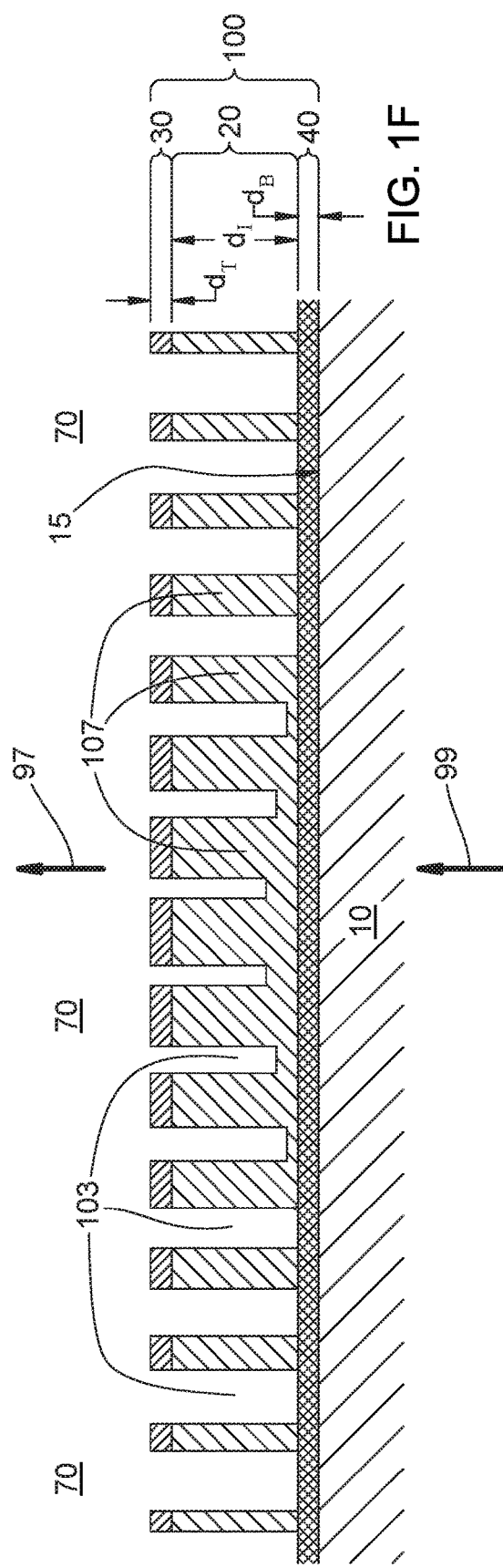

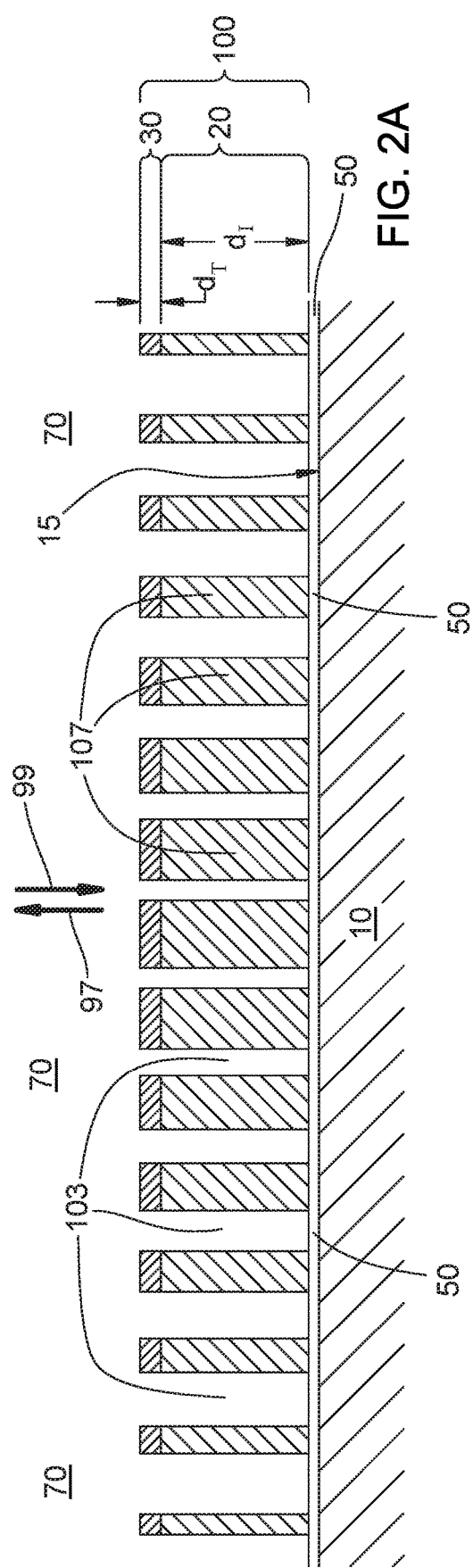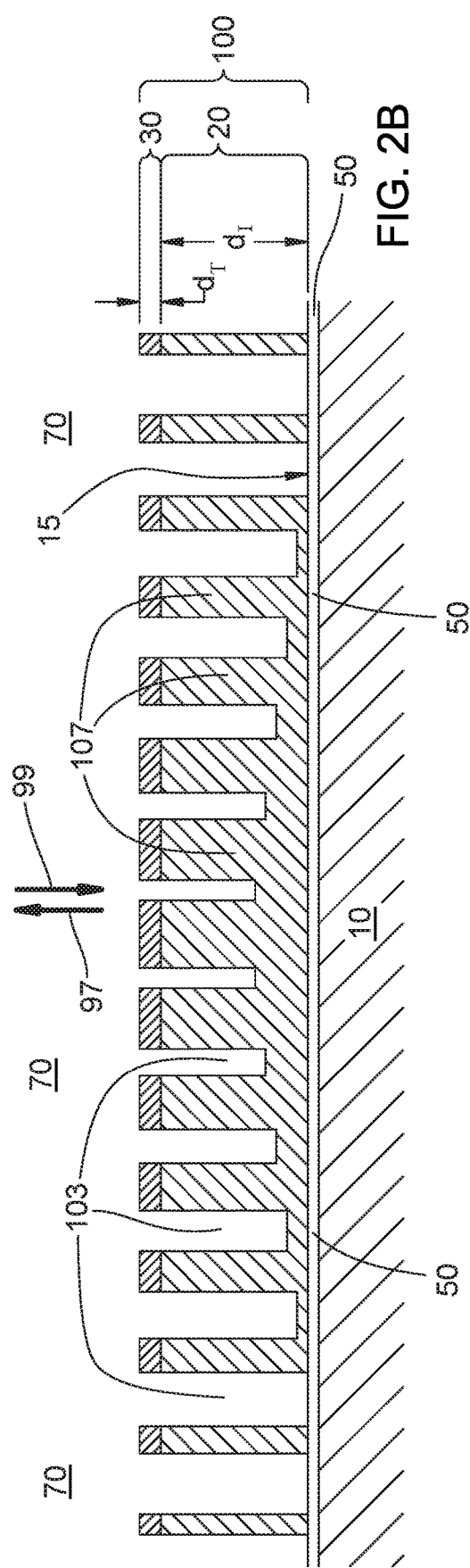

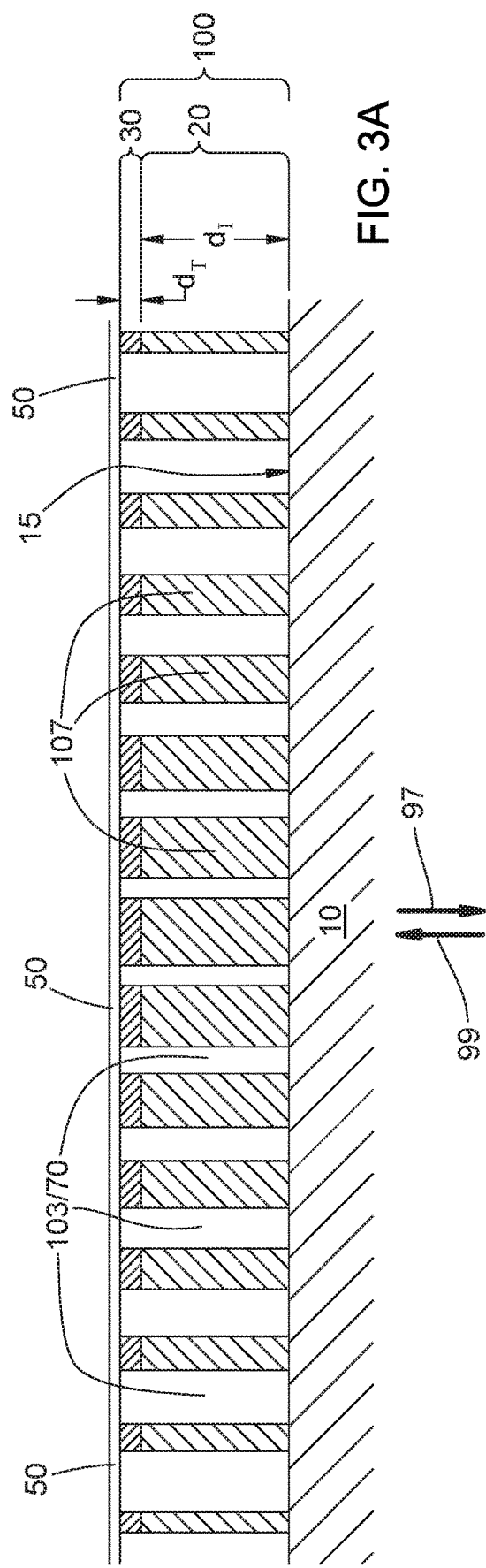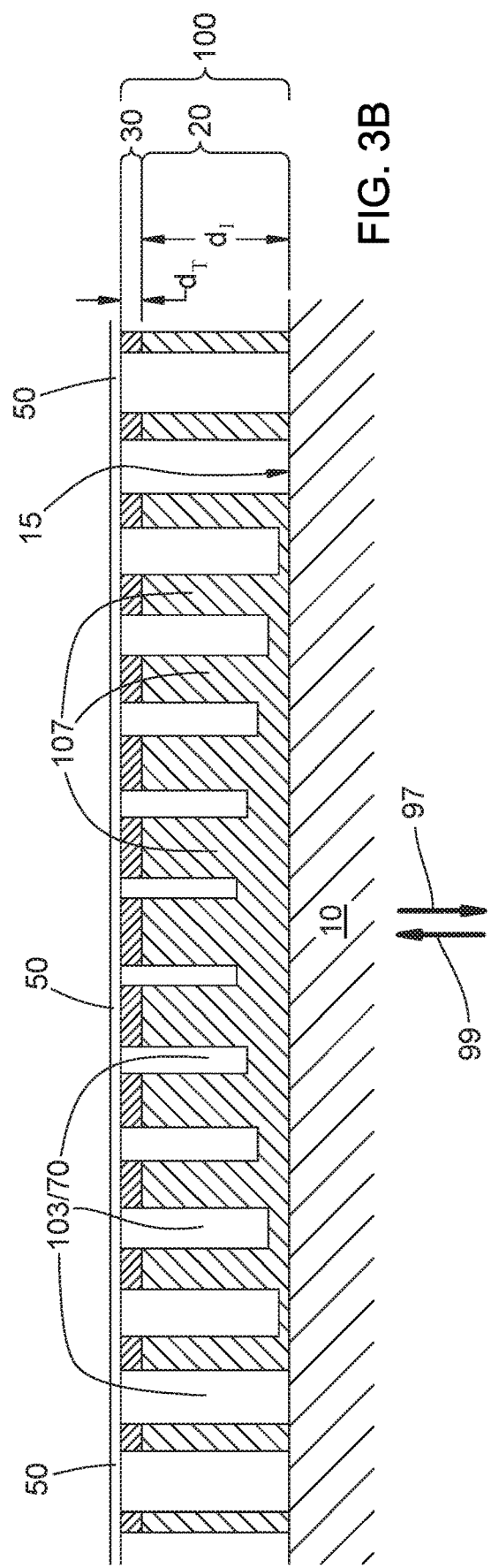

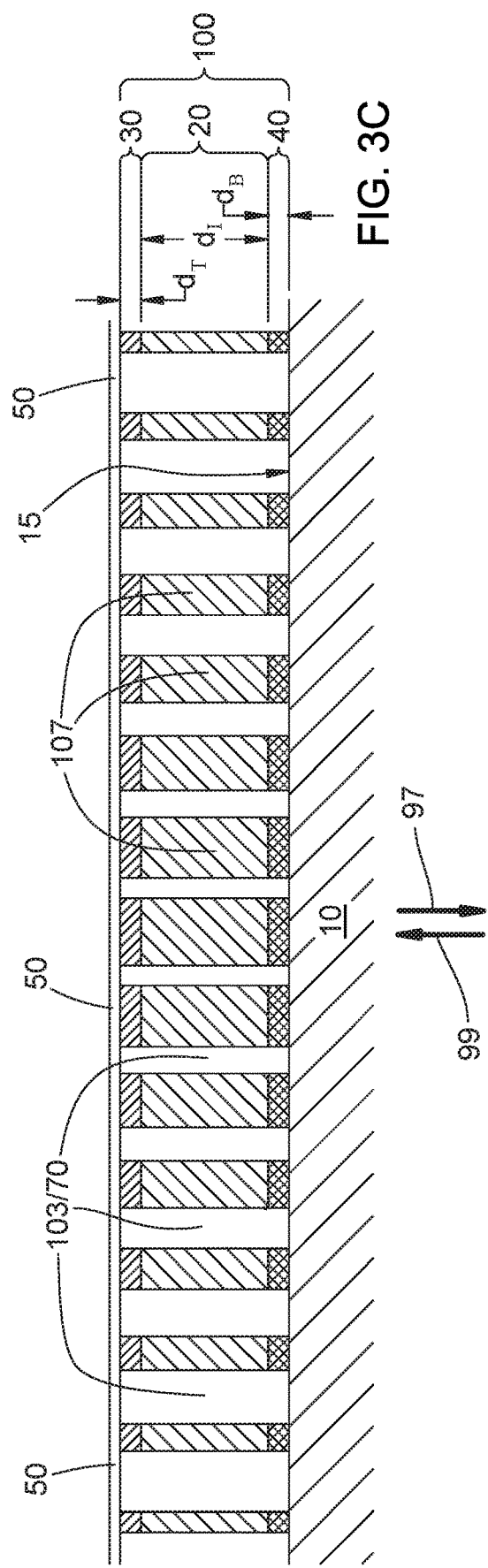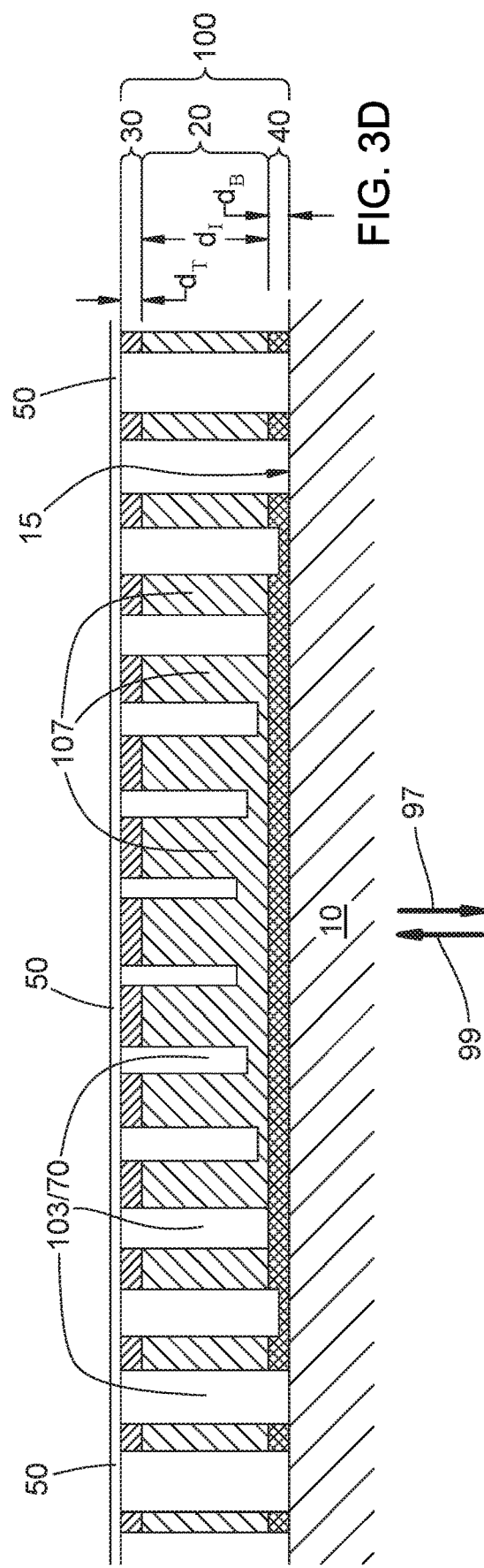

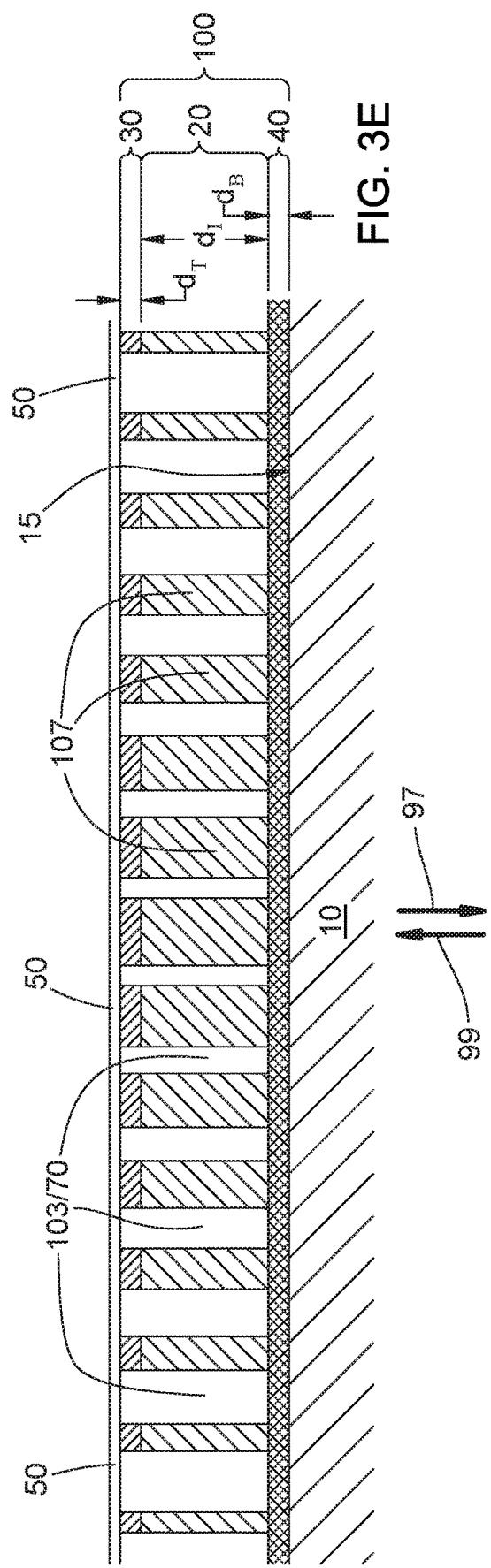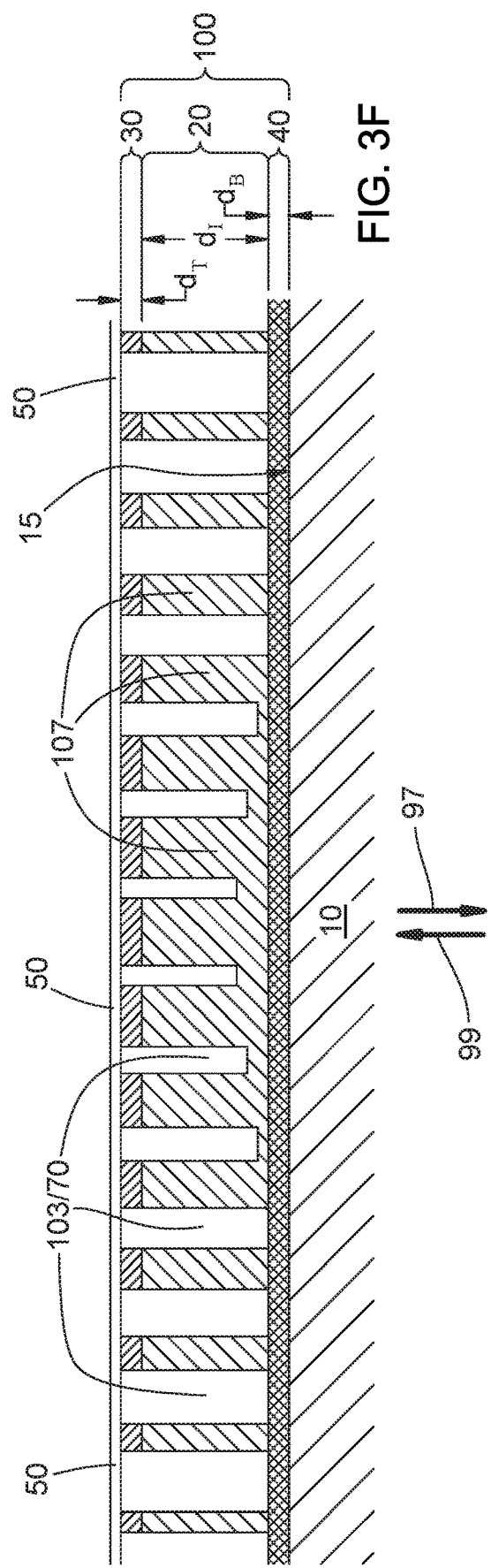

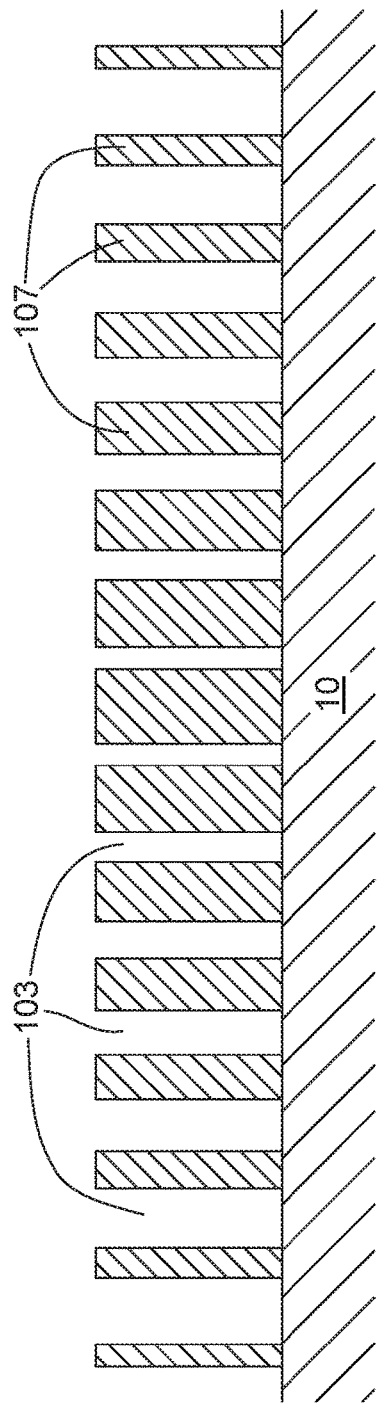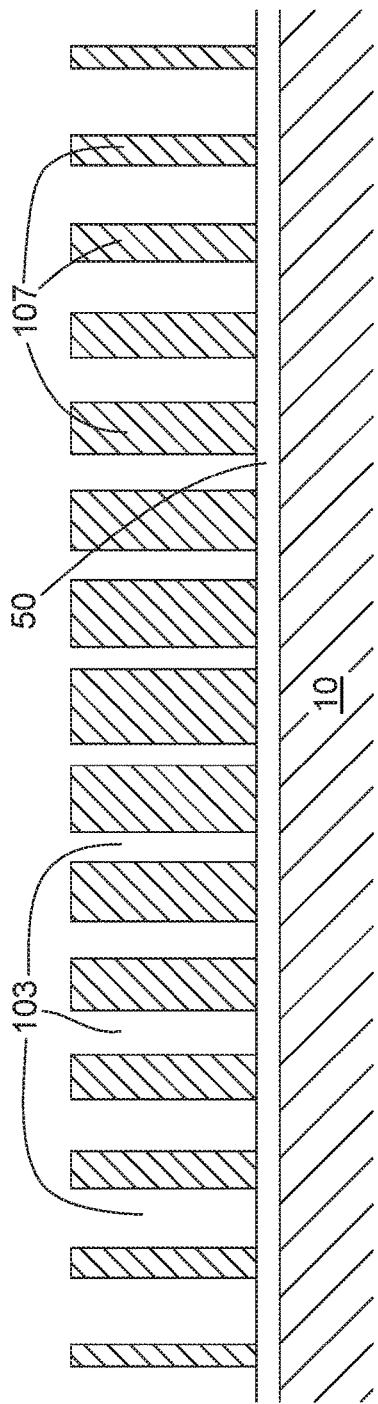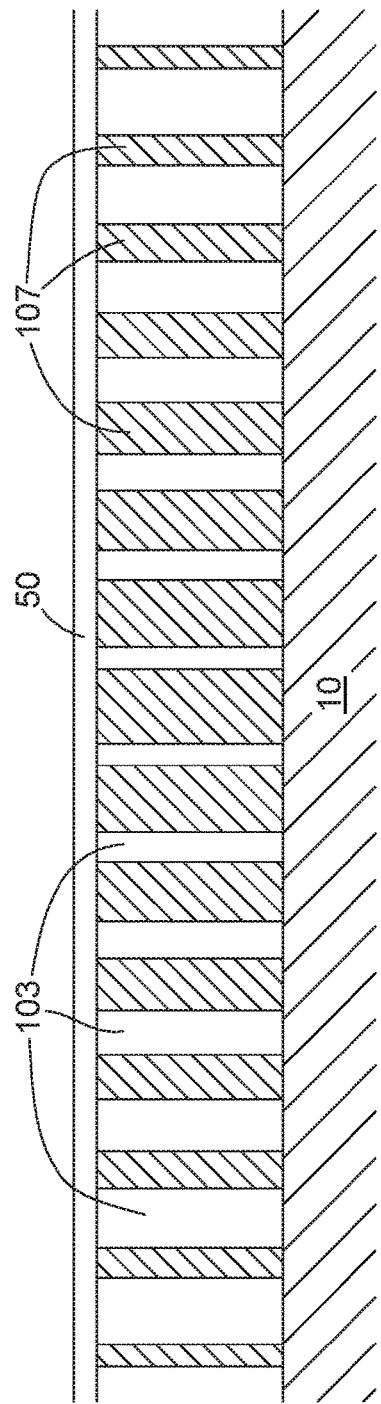

US 12,055,738 B2

PARTIALLY ETCHED PHASE-TRANSFORMING OPTICAL ELEMENT

CROSS-REFERENCE TO RELATED APPLICATIONS

This patent application is a divisional of U.S. application Ser. No. 16/802,339 filed Feb. 28, 2020, which claims the benefit of and priority to U.S. Provisional App. No. 62/810,834 filed Feb. 26, 2019 and U.S. Provisional App. No. 62/855,885 filed May 31, 2019. The Ser. No. 16/802,339 application and the 62/810,834 and 62/855,885 provisional applications are incorporated herein by reference.

FIELD

The embodiments discussed herein relate to partially etched phase-transforming optical elements.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

An example optical element includes a substrate, an intermediate layer, a topmost layer, and a contiguous multitude of recessed and non-recessed areal regions. The intermediate layer is formed over a top surface of the substrate and has a refractive index $n_I$. The topmost layer is formed directly on the intermediate layer and has a refractive index $n_T$ where $n_T \neq n_I$. The intermediate and topmost layers are substantially transparent over an operational wavelength range that includes a design wavelength $\lambda_0$. The areal regions of the multitude are variously sized and distributed transversely across the optical element. The multitude of areal regions includes a non-empty subset of areal regions having a largest transverse dimension less than about $\lambda_0$. Each non-recessed areal H region of the multitude includes corresponding areal portions of the intermediate and topmost layers. Each recessed areal region of the multitude extends entirely through the topmost layer and at least partly through the intermediate layer. The multitude of recessed areal regions includes a non-empty subset of recessed areal regions that extend entirely through the intermediate layer. Each recessed areal region is substantially filled with a fill medium that is substantially transparent over the operational wavelength range, the fill medium having a refractive index $n_F$ where $n_F \neq n_I$, $n_F \neq n_T$.

An example method to form an optical element that includes a substrate, an etchable layer, and a contiguous multitude of recessed and non-recessed areal regions includes depositing the etchable layer over the substrate directly on an etch stop layer that has a smaller etch rate than the etchable layer. An etch rate of the etchable layer increases with decreasing transverse dimensions of an areal region to be etched for at least a range of transverse dimensions. The method also includes spatially selectively etching entirely through the etchable layer to the etch stop layer for each of first and second areal regions to form first and second recessed areal regions by applying an etchant to the first and second areal regions. The first areal region has first transverse dimensions. The second areal region has second transverse dimensions that are less than the first transverse dimensions and that are within the range of transverse dimensions. The etch rate of the second areal region is less than the etch rate of the first areal region and greater than the etch rate of the etch stop layer. The etchant is applied to each of the first and second areal regions for the same duration of time. The etchable layer is etched entirely through in the first areal region before the etchable layer is etched entirely through in the second areal region. Depths of the first and second recessed areal regions are substantially equivalent.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 1A-1F are schematic cross-sectional views of examples of inventive, transmissive, phase-transforming optical elements.

FIGS. 2A-2F are schematic cross-sectional views of examples of inventive, reflective, phase-transforming optical elements with optical signal propagating through a fill medium.

FIGS. 3A-3F are schematic cross-sectional views of examples of inventive, reflective, phase-transforming optical elements with optical signal propagating through a substrate.

FIG. 8A-8C are schematic cross-sectional views of several conventional reference optical elements.

DETAILED DESCRIPTION

Figure 2C:
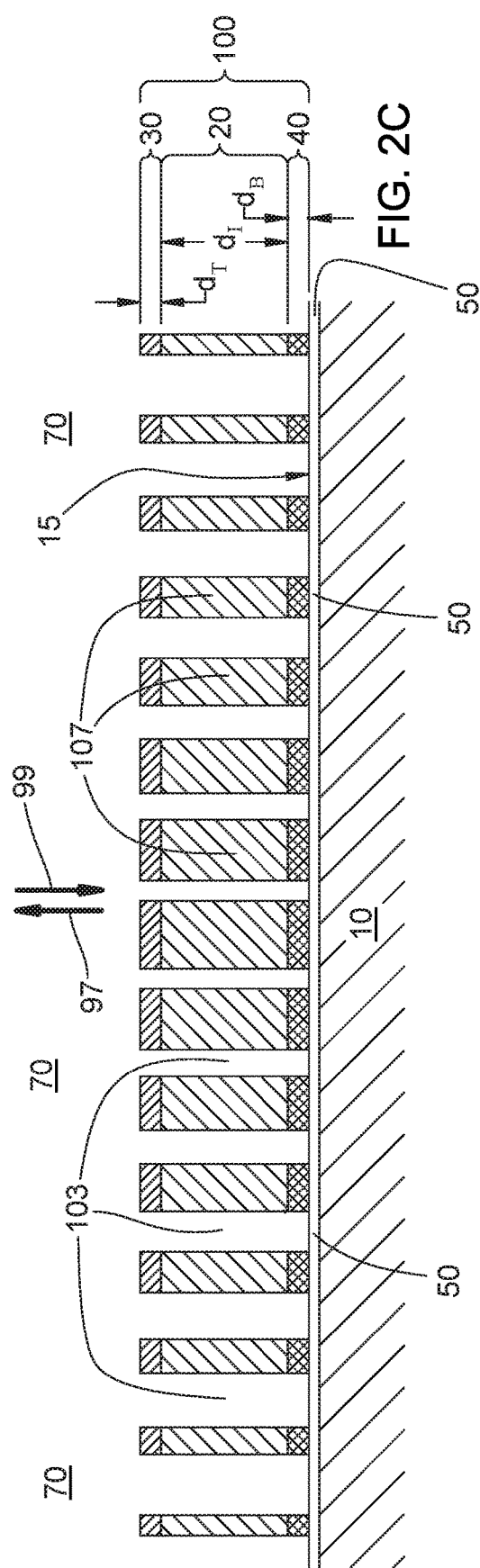

The embodiments depicted are shown only schematically; all features may not be shown in full detail or in proper proportion, certain features or structures may be exaggerated relative to others for clarity, and the drawings should not be regarded as being to scale. For example, the actual optical elements depicted as having a handful of recessed and non-recessed regions (e.g., ridges, grooves, posts, or holes) typically have thousands, or even one or more millions, of such regions per square millimeter; the number of regions is reduced in the drawings for clarity. In addition, the height, depth, width, or aspect ratio of each region, or thicknesses of constituent layers, often can be exaggerated relative to each other or, e.g., the thickness of an underlying substrate. Note also that the cross-sectional views of FIGS. 1A through 3F and 8A through 8C show the arrangement of the recessed and non-recessed areal regions along only a first transverse dimension at only one representative position along the second transverse dimension. In some instances that arrangement along the first transverse dimension does not vary with position along the second transverse dimension. However, it is more typically the case that the arrangement of the recessed and non-recessed areal regions varies in both transverse dimensions (e.g., as in FIGS. 5A, 5B, 6, and 7). The embodiments shown are only examples, and should not be construed as limiting the scope of the present disclosure or appended claims.

The present application is related to subject matter disclosed in: (i) U.S. Pat. No. 9,618,664; (ii) Pub. No. WO 2016/168093; (iii) U.S. Pub. No. 2017/0168202; (iv) U.S. Pub. No. 2018/0128948; (v) U.S. provisional App. No. 62/810,834 filed Feb. 26, 2019; (vi) U.S. provisional App. No. 62/855,885 filed May 31, 2019; and (vii) U.S. Pub. No. 2019/0212479. Each one of the foregoing is incorporated herein by reference; they are collectively referred to herein as "the incorporated references", and some of their contents are summarized below.

Optical elements of various types can be described generally as imposing some desired phase transformation function $\varphi(x,y)$ onto an optical signal propagating through or reflected from the optical element (where x and y are two-dimensional position coordinates along a surface of the optical element in directions substantially transverse to the propagation direction of the optical signal). In some transmissive optical elements, the phase transformation is imparted by a single-pass transmission; in some reflective optical elements, the phase transformation is imparted by double-pass transmission with an intervening reflection. Such a phase transformation function may also be referred to herein as a phase shift function, phase delay function, or phase function. It is the relative phase delay across an optical signal wavefront that is usually relevant, not the absolute phase delay. One example of a phase transformation function is a linear phase transformation function of the form $\varphi(x,y)=Ax+By$, which results in angular deflection of the optical signal without otherwise altering its spatial properties (somewhat analogous to refraction, with the direction and angle of deflection depending on the values of the constants A and B). A second example is a quadratic phase transformation function of the form $\varphi(x,y)=Ax^2+By^2$; $\varphi(x,y)$ written in this form assumes the coordinates x and y are centered with respect to $\varphi(x,y)$ and rotated to coincide with principal axes of $\varphi(x,y)$. A quadratic phase transformation acts as a positive or negative lens in the corresponding transverse dimension according to the signs of the constants A and B. If either A or B (but not both) is zero, then the phase transformation acts as a cylindrical lens (in the paraxial limit). If A=B, the phase transformation acts as a spherical lens (in the paraxial limit; example shown in FIGS. 5A and 5B). A third example is an angular phase transformation function of the form $\varphi(x,y)=M\theta$ for $0 \leq \theta < 2\pi$, where $\theta$ is related to x and y by $\cos\theta = x/(x^2+y^2)^{1/2}$ and $\sin\theta = (x^2+y^2)^{1/2}$ and M is an integer. Such an angular phase transformation acts as a so-called vortex plate that can be used, e.g., to convert an optical beam with a Gaussian intensity transverse profile into a beam with a doughnut-shaped intensity transverse profile. Phase transformation functions are additive, i.e., a phase transformation function $\varphi(x,y)$ can be a sum of two (or more) distinct, specified, position-dependent phase transformation functions $\varphi_1(x,y)$ and $\varphi_2(x,y)$. In one such example, $\varphi_1(x,y)$ can be a quadratic function and $\varphi_2(x,y)$ can be an angular function; the sum $\varphi(x,y)$ can result in, e.g., focusing of a Gaussian beam while simultaneously converting it to a doughnut-shaped beam, thereby combining the functions of a spherical lens and a vortex plate in a single optical element.

A specified phase transformation function $\varphi(x,y)$ can be imposed by an optical element that imparts a position-dependent phase shift or phase delay onto a transmitted or reflected optical beam. For a phase-transforming layer 100 of a transmissive optical element (e.g., as in FIGS. 1A-1F; referred to herein as single-pass transmissive optical elements) comprising a set of two or more transmissive optical media, the phase transformation function $\varphi(x,y)$ for a given vacuum wavelength $\lambda$ can be generally approximated by $\varphi(x,y) \approx (2\pi/\lambda) \cdot \Sigma_i n_i(\lambda) \cdot d_i(x,y)$ (for a transmitted optical signal at normal incidence), where $n_i(\lambda)$ is the refractive index of each optical medium and $d_i(x,y)$ is the local thickness of each optical medium through which the optical signal propagates. A similar approximation can be calculated for non-normal incidence, and in many instances is approximately proportional to the expression for normal incidence (i.e., differing by an overall multiplicative factor, but having substantially the same dependence on transverse position (x,y)). Assuming back-surface reflection for a reflective optical element that includes such a phase-transforming layer 100 (e.g., as in FIGS. 2A-3F; referred to herein as double-pass reflective optical elements), the phase transformation function $\varphi(x,y)$ at normal incidence can be approximated by $\varphi(x,y) \approx (4\pi/\lambda) \cdot \Sigma_i n_i(\lambda) \cdot d_i(x,y)$ because the optical signal propagates through the phase-transforming layer 100 twice. A similar approximation can be calculated for non-normal incidence, often approximately proportional to the normal-incidence approximation, as explained above.

In a singlet refractive lens, a single optical medium is employed and the thickness varies with respect to transverse position. In so-called gradient-index elements (e.g., a GRIN lens), the refractive index varies with transverse position. Certain phase transformation profiles are relatively easy to produce by standard manufacturing techniques. Spherical lenses, for example, provide a quadratic phase transformation (in the paraxial limit) and are easily manufactured; GRIN lenses can be readily manufactured from segments of optical fiber. Other more arbitrary phase transformation functions $\varphi(x,y)$ are not necessarily quite so readily produced. It would be desirable to produce an optical element having an arbitrarily specified phase transformation function $\varphi(x,y)$.

Figure 4A:
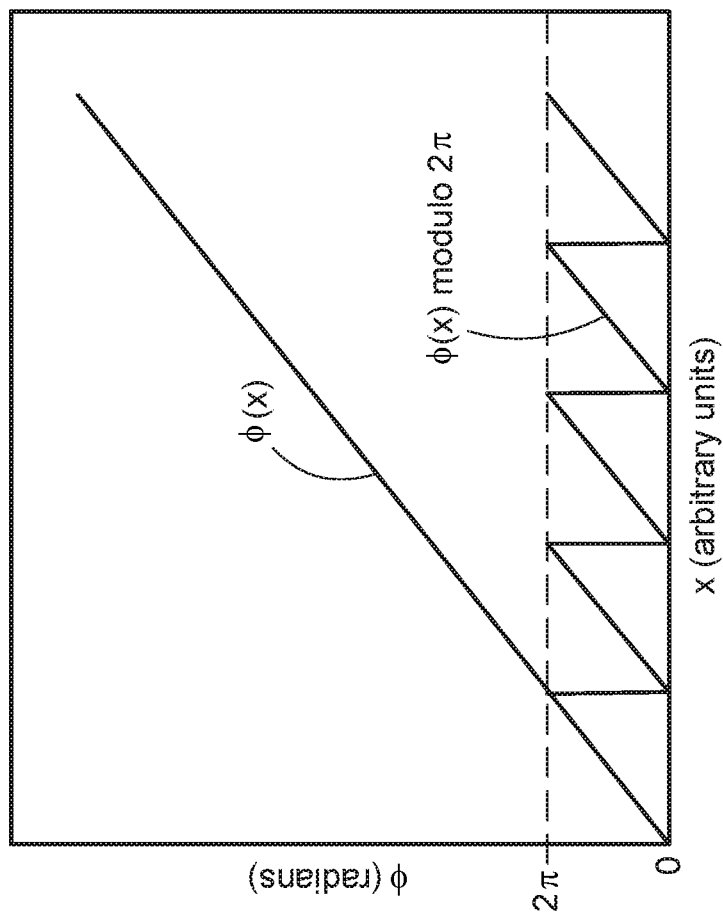
FIGS. 4A and 4B illustrate schematically phase functions and their modulo $2\pi$ equivalents.
Figure 4B:
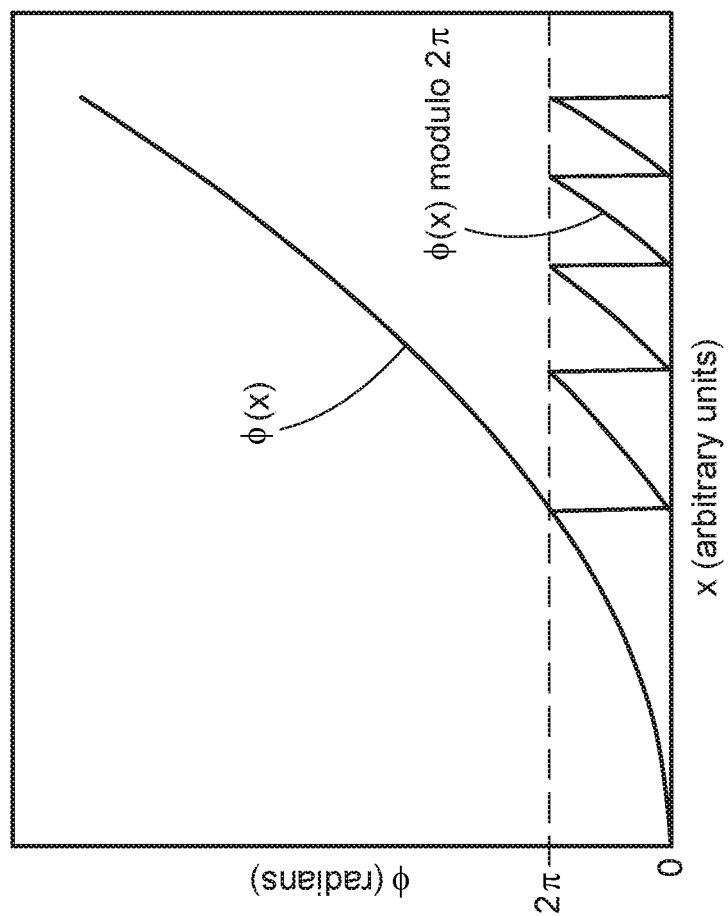
Figure 5A:
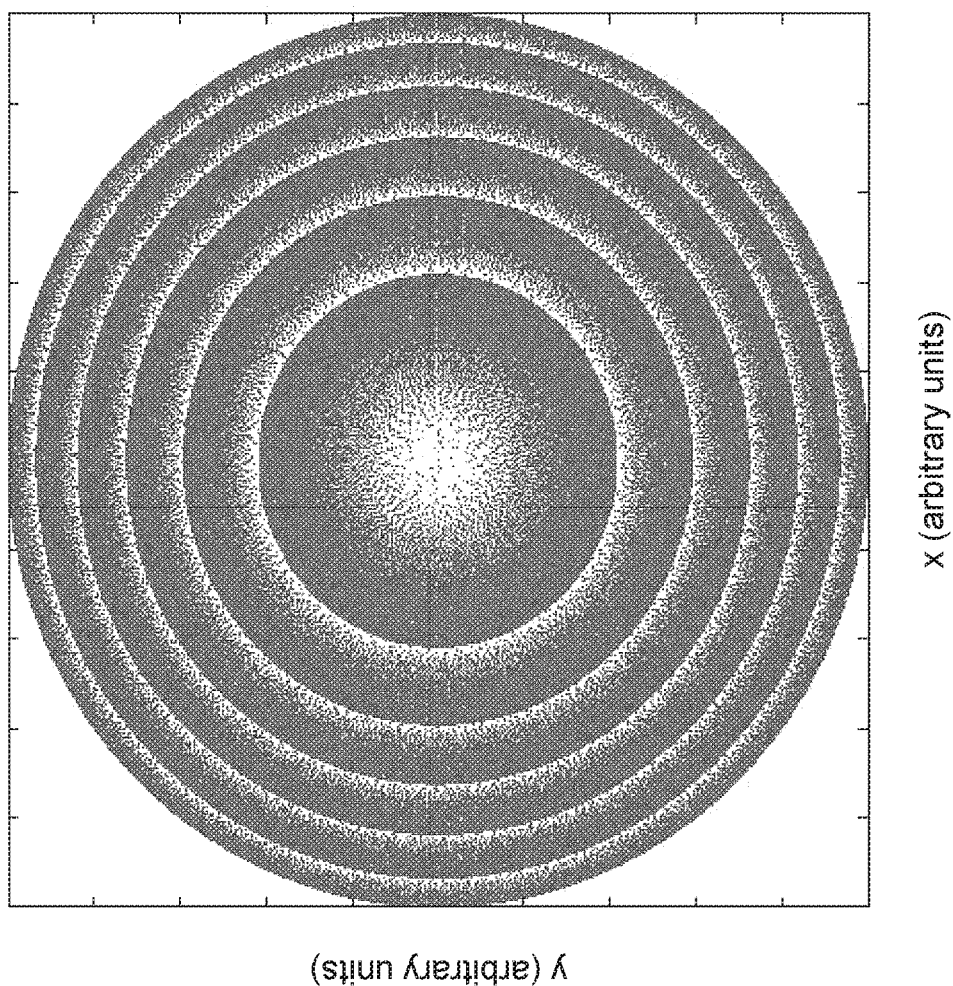
FIGS. 5A and 5B are schematic top views of an example of an inventive, phase-transforming optical element arranged to function as a lens.
Figure 5B:
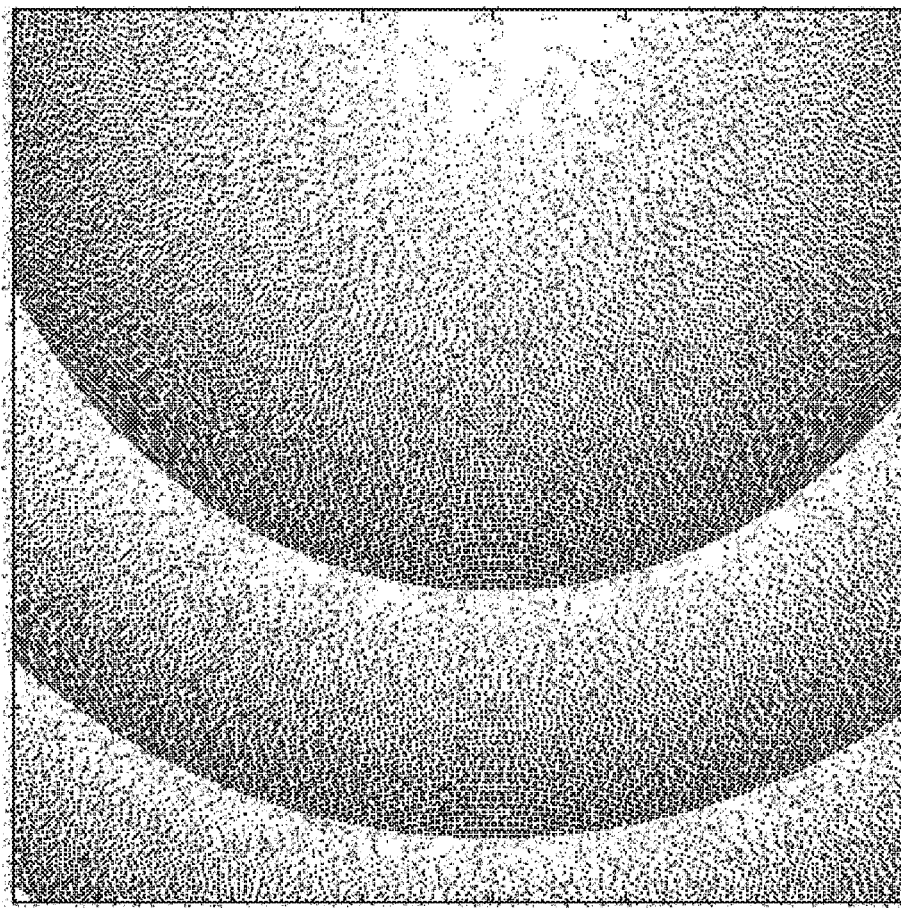

Because of the periodic nature of optical signals, phase delays separated by integer multiples of $2\pi$ all have the same effect on the optical signal. Because of the periodicity, any given phase transformation function can be replaced with an equivalent modulo $2\pi$ function, i.e., each function value can be replaced by the corresponding value from 0 to $2\pi$ that differs from the original value by an integer multiple of $2\pi$. The original phase function and its modulo $2\pi$ equivalent effect the same transformation on an optical signal. Illustrative examples are shown in FIG. 4A (showing a linear phase shift function $\varphi(x)$ and its modulo $2\pi$ equivalent) and FIG. 4B (showing a quadratic phase shift function $\varphi(x)$ and its modulo $2\pi$ equivalent). In addition, phase transformation functions that differ from one another at any given point by an integer multiple of 2π (not necessarily the same multiple of 2π at each point) can be regarded as being equal to one another.

Spatially selective material processing techniques, e.g., photolithography or e-beam lithography, can in principle be employed to produce an optical element that imparts a specified, arbitrary phase transformation function φ(x,y). However, most such techniques are best suited for forming a spatial profile having only two levels, (e.g., a given area can be etched or not, photo-exposed or not, doped or not) and so are not quite so readily employed to provide an arbitrary phase transformation function with a continuous (or near continuous) relative phase distribution. Grayscale or multilevel lithography techniques can produce an optical element that imparts a continuous, or near-continuous, arbitrary phase function, but such techniques are far more complex and are difficult to implement reproducibly or at production scales. In addition, the minimum transverse distance over which the effective phase function can be varied typically is limited to several microns, so that practicably realizable effective phase functions can exhibit only relatively slow spatially variation. It would be more desirable to enable use of a two-level lithographic technique (i.e., binary lithography) to produce optical elements for imparting a specified, arbitrary phase transformation function φ(x,y) In some such instances, partial reflow of one or more of the lithographically patterned materials can be employed after lithographic processing to alter further the spatial profile of the reflowed material. Inventive optical elements disclosed herein are formed using binary lithographic techniques, without subsequent reflow, to impart a specified, arbitrary phase transformation function, or at least an operationally acceptable approximation thereof.

In the context of the instant specification and appended claims, the phrase "operationally acceptable" indicates a condition or arrangement that deviates from an ideal condition or arrangement by an amount that still enables the optical device to perform adequately in a given operational context. For example, a conventional singlet lens that deviates from an ideal spherical surface by as much as λ/4 might be sufficient for some imaging applications, while other imaging applications might require more stringent surface accuracy, e.g., λ/20. In the first instance the operationally acceptable surface accuracy would be λ/4, while in the second instance the operationally acceptable surface accuracy would be λ/20.

Some examples of inventive optical elements disclosed herein (e.g., as in FIGS. 1A-3F) include a substantially solid substrate 10, a substantially solid intermediate layer 20 formed over a top surface 15 of the substrate 10, a substantially solid topmost layer 30 formed directly on the intermediate layer 20, and a contiguous multitude of recessed and non-recessed areal regions 103 and 107, respectively. For purposes of the present description and appended claims, a first layer "formed directly on" a surface or a second layer means that the first layer is in direct contact with the surface or second layer, with no other intervening optical layer. For purposes of the present description and appended claims, a first layer "formed over" a surface or a second layer means that the first layer (i) can be in direct contact with the surface or second layer, with no other intervening optical layer, or (ii) can be separated from the surface or second layer by one or more intervening optical layers. The intermediate and topmost layers 20 and 30 are substantially transparent over an operational wavelength range that includes a design wavelength $\lambda_0$; the intermediate layer 20 is characterized by a refractive index $n_I$ and a substantially uniform thickness $d_I$;

the topmost layer 30 is characterized by a refractive index $n_T$ and a substantially uniform thickness $d_T$, and $n_I \neq n_T$. The areal regions 103 and 107 of the multitude are variously sized and distributed transversely across the optical element, and the multitude includes a non-empty subset of the areal regions 103 or 107 having a largest transverse dimension less than about $\lambda_0$. Each non-recessed areal region 107 of the multitude comprises corresponding areal portions of the intermediate and topmost layers 20 and 30. Each recessed areal region 103 of the multitude extends entirely through the topmost layer 20 and at least partly through the intermediate layer 30; the multitude of recessed areal regions 103 includes a non-empty subset of recessed areal regions 103 that extend entirely through the intermediate layer 30. Each recessed areal region 103 is substantially filled with a fill medium 70 that is substantially transparent over the operational wavelength range and characterized by a refractive index $n_F$, and $n_I \neq n_F \neq n_T$. Note that while not explicitly indicated, the refractive indices $n_T$, $n_I$, and $n_F$, as well as other refractive indices mentioned below, are functions of the wavelength λ of an incident optical signal 99; that wavelength dependence is not explicitly shown in the description or in the appended claims. Any quantities that depend on those indices are also functions of the wavelength λ.

The optical element is structurally arranged so as to receive on at least a portion of the contiguous multitude of areal regions 103 and 107 an incident optical signal 99, within the operational wavelength range, and to transmit or reflect at least a portion of the incident optical signal 99 as a phase-transformed optical signal 97. The phase-transformed optical signal 97 is transformed substantially according to a specified effective phase transformation function $\varphi_{eff}(x,y)$ that varies as a function of transverse two-dimensional position coordinates x and y across the optical element. The refractive indices $n_T$, $n_I$, and $n_F$, the thicknesses $d_T$ and $d_I$, and arrangement of the variously sized and distributed areal regions 103/107 of the multitude result in the areal regions 103/107 of the optical element collectively imparting onto the phase-transformed optical signal 97 the effective phase transformation $\varphi_{eff}(x,y)$.

Propagation of an optical signal 99 at the design wavelength $\lambda_0$ through the phase-transforming layer at normal incidence at given position (x,y) would nominally result in a local phase delay of $\varphi(x,y)=\varphi_R$ in a recessed areal region 103 and $\varphi(x,y)=\varphi_{NR}$ in a non-recessed areal region 107, with $\varphi_R \neq \varphi_{NR}$. The resulting effective phase transformation $\varphi_{eff}(x,y)$ arises from spatially averaged "sampling" of $\varphi_R$ and $\varphi_{NR}$ due to the wave nature of the incident optical signal 99, as described below. Approximate expressions for $\varphi_R$ and $\varphi_{NR}$ for various example embodiments of an inventive optical element are discussed further below. A binary lithographic technique can be employed to provide those two distinct phase delays, e.g., by a masked etch process that forms recessed areal regions 103 on unmasked areas while leaving non-recessed areal regions 107 on masked areas. In some examples (e.g., FIGS. 1A, 1C, 1E, 2A, 2C, 2E, 3A, 3C, and 3E), the phase delay $\varphi_R$ is substantially uniform among the multitude of recessed regions 103 and the phase delay $\varphi_{NR}$ is substantially uniform among the non-recessed regions 107. In other examples (e.g., FIGS. 1B, 1D, 1F, 2B, 2D, 2F, 3B, 3D, and 3F), one or both of the phase delays $\varphi_R$ or $\varphi_{NR}$ can vary among the recessed regions 103 or the non-recessed regions 107, respectively. In the examples of FIGS. 1B, 1D, 1F, 2B, 2D, 2F, 3B, 3D, and 3F, the phase delay $\varphi_{NR}$ is substantially uniform among the non-recessed regions 107, while the phase delay $\varphi_R$ varies among the recessed regions 103 according to the varying depths of the recessed regions 103. Some of the recessed regions 103 of such examples extend entirely through the topmost layer 30 and the intermediate layer 20 (resulting in the maximum difference between the phase delays $\varphi_R$ and $\varphi_{NR}$), while other recessed regions 103 extend through the topmost layer 30 and only partly through the intermediate layer 20 (resulting in correspondingly smaller differences between the phase delays $\varphi_R$ and $\varphi_{NR}$ as the depth decreases).

In some examples of etch processes that can be used to form the recessed regions 103, the etch rate is substantially uniform among recessed regions 103 regardless of the transverse dimensions of each region. In such examples, all of the recessed areal regions 103 have substantially the same depth and extend entirely through the topmost and intermediate layers 30 and 20; the resulting phase delay (R is substantially uniform among the recessed regions 103 (e.g., as in FIGS. 1A, 1C, 1E, 2A, 2C, 2E, 3A, 3C, and 3E).

In other examples of etch processes that can be employed to form the recessed regions 103, the etch rate varies with transverse dimensions of an areal region. For a given etch process performed under a given set of process conditions, larger recessed regions 103 down to some corresponding characteristic transverse size exhibit a uniform, maximum etch rate, while regions smaller than the characteristic size exhibit etch rates that decrease with decreasing transverse dimensions of the recessed region 103. For some such etch processes, a suitable etch stop can be employed, however, and recessed regions 103 all having substantially the same depth can be formed despite the differing etch rates. An etch stop (either a separate layer formed for only that purpose, or a layer or substrate surface that also serves another purpose) exhibits an etch rate that is significantly smaller than the etch rate of the intermediate layer 20, in some examples negligibly small. If the etch rate of the etch stop is sufficiently small, then the etch process will stop (or slow to a negligible rate) upon reaching the etch stop in larger recessed regions 103 that exhibit the maximum etch rate, while regions having a smaller etch rate continue to be etched until they "catch up" when the etch process reaches the etch stop.

In some other examples of etch processes that can be employed to form the recessed regions 103 and that exhibit etch rates that decrease with decreasing transverse size, a suitable etch stop might not be available, the etch rate of the etch stop might not be as small as might be desirable or necessary, or the etch mask employed (photo resist, hard mask, or other) might wear down before the etch stop is reached in some etched regions. Such an etch process typically results in larger recessed regions 103 having a substantially uniform, maximum depth and other, smaller recessed regions 103 having smaller depths that decrease with decreasing transverse size (e.g., FIGS. 1B, 1D, 1F, 2B, 2D, 2F, 3B, 3D, and 3F). The maximum etch rate, the characteristic transverse size (above which the maximum etch rate is attained), and the dependence of the decreasing etch rate on decreasing transverse size (for regions smaller than the characteristic transverse size) can be determined for a selected etch process as a function of process conditions (e.g., in a reactive ion etch process, process conditions can include chamber pressure, gas and ion species employed such as argon or $CF_4$ or $SF_6$, gas concentrations and flow rates, applied RF power or frequency, and so forth). Once determined, those parameters can be included in the design of a particular optical element, either to enable the absence or inadequacy of an etch stop to be compensated for in a design of an optical element, or instead as an additional set of parameters employed for designing an optical element, even if an adequate etch stop is available. For example, the presence of recessed regions 103 that extend only partly through the intermediate layer 20 can enable a greater range of phase delays to be realized in a transmissive layer 100 of a given thickness, or can enable a range of phase delays spanning (or nearly spanning) a range of about $2\pi$ using a thinner transmissive layer 100. Note that the varying depths of the recessed regions 103 nevertheless result from a binary etch process, i.e., each recessed region is either etched (unmasked) or not (masked), and all for the same amount of etch time; the differing depths arise from etch rates during that binary etch process that differ among recessed regions of differing transverse sizes.

In examples wherein an etch stop is absent or inadequate, control of the etch time (to obtain the desired maximum etch depth in larger regions 103 and the desired lesser etch depths in smaller regions 103) can be achieved in any suitable way to obtain the desired depths. In some examples the etch time can be estimated based on a known or measured etch rate of a large unmasked area. In other examples, potentially more precise control of the etch depths might be obtained by detecting which material(s) are being etched as a function of time, e.g., by monitoring the presence or absence of certain atomic, chemical, or ionic species ejected from the etched surface during the etch process, or by visual, spectroscopic, or other measurement of the etched surface during the etch process. In some examples, a detected decrease in the presence of species indicative of etching the intermediate layer 20 might serve as a signal to terminate the etch process. In some other examples, detected appearance of species indicative of etching the substrate 10, or a layer between the substrate 10 and the intermediate layer 20, might serve as a signal to terminate the etch process. In still other examples, appearance of a spectroscopic feature specific to a layer or substrate exposed by etching entirely through the intermediate layer 20 might serve as a signal to terminate the etch process. Other suitable process control schemes can be employed as needed or desired.

Due to the wave nature of the optical signal 99 having wavelength $\lambda_0$, and the presence of recessed or non-recessed areal regions 103 or 107 having largest transverse dimensions less than about $\lambda_0$, the optical signal 99 propagating through the phase-transforming layer 100 is affected by (i.e., effectively "samples") multiple adjacent recessed and non-recessed areal regions 103 and 107, or portions thereof, within a surrounding "sample" area having transverse dimensions about equal to $\lambda_0$. The effective phase delay imparted onto the optical signal 99 at position (x,y) is approximately equal to a spatial average of $\varphi_R$ and $\varphi_{NR}$ (weighted according to the respective fractional areas occupied by recessed and non-recessed areal regions 103 and 107, or portions thereof, encompassed by the "sample" area).

The desired effective phase function $\varphi_{eff}(x,y)$ is obtained by altering the local fractional areal densities of the recessed and non-recessed areal regions 103 and 107 (weighted by the phase delays $\varphi_R$ and $\varphi_{NR}$, respectively) as a function of transverse position (x,y) across the surface of the optical element, thereby enabling an arbitrary phase function to be approximated despite the binary nature of the process that forms the recessed and non-recessed areal regions 103 and 107. The maximum difference between the phase delays $\varphi_R$ and $\varphi_{NR}$ typically is at least $2\pi$, so that an arbitrary modulo $2\pi$ phase function can be approximated. As noted above, the multitude of areal regions 103 and 107 includes a non-empty subset of areal regions 103 or 107 having a largest transverse dimension less than about $\lambda_0$. In some examples, the non-empty subset can include only recessed areal regions 103; in some other examples, the non-empty subset can include only non-recessed areal regions 107; in still other examples, the non-empty subset can include only both recessed and non-recessed areal regions 103 and 107. In some examples, the multitude of areal regions 103 and 107 can include a non-empty subset of areal regions 103 or 107 having a largest transverse dimension less than about $\lambda_0/2$, less than about $\lambda_0/4$, or less than about $\lambda_0/10$, or even smaller. Smaller areal regions enable better approximation of the desired phase function $\varphi(x,y)$ by the effective phase function $\varphi_{eff}(x,y)$.

Any suitable or desirable effective phase function $\varphi_{eff}(x,y)$ can be approximated by the multitude of recessed and non-recessed areal regions 103 and 107. In some examples, $\varphi_{eff}(x,y)$ varies with both x and y. In some examples the position-dependent effective phase transformation function $\varphi_{eff}(x,y)$ is a modulo $2\pi$ function. In some examples the effective phase transformation function $\varphi_{eff}(x,y)$ approximates a function of the form $\varphi(x,y)=Ax^2+By^2$, or $y(x,y)=Ax^2+By^2$ modulo $2\pi$, where A and B are non-zero, positive or negative real numbers, so that the optical element functions as a lens. In some examples, the effective phase transformation function $\varphi_{eff}(x,y)$ approximates a function of the form $\varphi(\theta)=M\theta$, or $\varphi(\theta)=M\theta$ modulo $2\pi$, for $0 \leq \theta < 2\pi$, where $\theta$ is related to x and y by $\cos\theta=x/(x^2+y^2)^{1/2}$ and $\sin\theta=y/(x^2+y^2)^{1/2}$ and M is a non-zero integer, and the optical element functions as a vortex plate. In some examples the effective phase transformation function $\varphi_{eff}(x,y)$ approximates a sum, or a modulo $2\pi$ sum, of distinct, specified, position-dependent phase transformation functions $\varphi_1(x,y)$ and $\varphi_2(x,y)$. In one such example, (i) $\varphi_1(x,y)=Ax^2+By^2$, or $\varphi_1(x,y)=Ax^2+By^2$ modulo $2\pi$, where A and B are non-zero, positive or negative real numbers, and (ii) $\varphi_2(x,y)=M\theta$, or $\varphi_2(\theta)=M\theta$ modulo $2\pi$, for $0 \leq \theta < 2\pi$, where $\theta$ is related to x and y by $\cos\theta=x/(x^2+y^2)^{1/2}$ and $\sin\theta=y/(x^2+y^2)^{1/2}$ and M is a non-zero integer; in that example, the optical element functions as a vortex lens.

Typically, only zero-order transmission or reflection of the incident optical signal 99 is desired; non-zero-order diffraction (reflective or transmissive) may represent an undesirable loss of intensity from the phase-transformed optical signal 97. Accordingly, arrangement of the variously sized and distributed areal regions 103 and 107 of the multitude typically result in no, or only negligible, non-zero-order diffraction of the incident optical signal 99 (reflective or transmissive), or in non-zero-order diffraction at or below an operationally acceptable level. That lack of non-zero-order diffraction distinguishes the inventive optical elements disclosed herein from conventional, diffractive optical elements having superficially similar morphology but on larger length scales, so as to permit and often enhance non-zero-order diffraction. Such conventional, diffractive optical elements also are not arranged so as to impart a phase transformation that varies with transverse position across the optical element. See, e.g.: U.S. Pat. Nos. 7,019,904; 7,142,363; 7,688,512; 8,040,607; 8,165,436; 8,989,537; and EP 1 783 520.

In the incorporated references, examples are disclosed in which each non-recessed areal region comprises only a single material. A suitable thickness is chosen based on the material's refractive index (typically to enable at least a $2\pi$ phase shift differential between recessed and non-recessed areal regions), and then suitable sizes and spatial arrangement are determined for the recessed and non-recessed areal regions to effect the desired effective phase function $\varphi_{eff}(x,y)$ at the design wavelength $\lambda_0$. For a given phase function and refractive indices of the recessed and non-recessed areal regions, there is essentially no remaining design flexibility. The inventive optical elements disclosed herein include at least two different materials in each non-recessed areal region 107 (i.e., corresponding areal portions of at least the intermediate and topmost layers 20 and 30 within each non-recessed areal region 107). Inclusion of multiple materials in each non-recessed areal region 107 provides two additional parameters that can be varied when designing the optical element, namely, an additional pair of thickness and refractive index. Accordingly, for a given desired effective phase function $\varphi_{eff}(x,y)$, the parameters $n_T$, $d_T$, $n_I$, $d_I$, and $n_F$ can be selected (by calculation, simulation, iterative procedure, or other suitable way), and the variously sized and distributed areal regions of the multitude can be arranged, to result in one or more improved performance parameters of the optical element, in addition to imparting the effective phase transformation $\varphi_{eff}(x,y)$. "Improved" performance parameters in this case are in comparison to a reference optical element that is arranged (as described in the incorporated references) so as to impart the same effective phase transformation $\varphi_{eff}(x,y)$ with areal regions variously sized and distributed transversely across the reference optical element in the same transverse arrangement as the inventive optical element and with non-recessed areal regions of the reference optical element that include only a single material. To achieve the same magnitude of phase transformation, the depth of the recessed regions of the reference optical element might differ from those of the corresponding inventive optical element based on the difference in refractive indices among the topmost, intermediate, and (if present) bottom layers. Examples of such reference optical elements are illustrated schematically in FIG. 8A (suitable for comparison with inventive examples of FIGS. 1A-1F), FIG. 8B (suitable for comparison with inventive examples of FIGS. 2A-2F), and FIG. 8C (suitable for comparison with inventive examples of FIGS. 3A-3F).

It should be appreciated that there can be many combinations of the parameters $n_T$, $d_T$, $n_I$, $d_I$, and $n_F$ that can result in the desired phase function $\varphi_{eff}(x,y)$. Within that solution space, specific values of the parameters $n_T$, $d_T$, $n_I$, $d_I$, and $n_F$ can be selected based on any one or more necessary, desirable, or suitable criteria, including, e.g.: material cost, availability, or physico-chemical properties or compatibilities; or one or more improved performance parameters of the optical element. Such improvement of one or more performance parameters can include one or more of: decreased or minimized reflectivity of the optical element; increased or maximized reflectivity of the optical element; achieving a level of reflectivity within an operationally acceptable range around a desired level of reflectivity; decreased or minimized transmission of the optical element; increased or maximized transmission of the optical element; achieving a level of transmission within an operationally acceptable range around a desired transmission level; increased or maximized overall optical throughput of the optical element; increased or maximized focusing efficiency when the optical element is arranged to function as a lens or focusing mirror; decreased or minimized polarization dependence of the optical element; increased or maximized polarization dependence of the optical element; achieving a level of polarization dependence within an operationally acceptable range around a desired level of polarization dependence; decreased or minimized linear or circular birefringence of the optical element; increased or maximized linear or circular birefringence of the optical element; achieving a level of linear of circular birefringence within an operationally acceptable range around a desired level of linear or circular birefringence; decreased or minimized angular dependence of the optical element; increased or maximized angular dependence of the optical element; achieving a level of angular dependence within an operationally acceptable range around a desired level of angular dependence; or increasing, maximizing, decreasing, minimizing, or achieving one or more other performance parameters of the optical element. Methods for determining a set of suitable device parameters $n_T$, $d_T$, $n_I$, $d_I$, and $n_F$, as well as a suitable size distribution and spatial arrangement of the recessed and non-recessed areal regions 103 and 107, are described further below.

A common objective is to reduce unwanted reflection, and the design and optimization in some ways resembles a much more complex version of designing a conventional anti-reflection coating; unlike designing a simple anti-reflection coating, a design to reduce unwanted reflectivity of an inventive phase-transforming optical element must account for more layers and also for the presence of the multitude of recessed and non-recessed areal regions 103 and 107. Design calculations of varying levels of complexity can be performed to arrive at suitable refractive indices, layer thicknesses, and sizes and distribution of the areal regions, however, an iterative design/fabricate/test/adjust/repeat procedure is often needed to arrive at the final design (discussed further below). Examples of suitable computational techniques or software packages include: a rigorous coupled-wave analysis (RCWA), GSolver©, TFCalc™, Concise MacLeod Thin Film Design software, and so forth. For some performance characteristics (e.g., birefringence), the transverse shape of the recessed or non-recessed regions may be varied or optimized (e.g., circular versus elliptical posts or holes); suitable corresponding computational techniques or software packages include: two-dimensional RCWA or finite-difference time-domain software such as Lumerical.

Because the fractional areas occupied by the recessed and non-recessed areal regions 103 and 107 necessarily vary with transverse position across the optical element (so as to impart the phase function $\varphi_{eff}(x,y)$), any given set of device parameters $n_T$, $d_T$, $n_I$, $d_I$, and $n_F$ will achieve a given level of "improvement" of a given performance parameter only at certain transverse positions across the optical element. Variation of the fractional areas with transverse position results in corresponding transverse variation of optical performance parameters, due to the same effective spatial averaging discussed above that provides the effective phase function $\varphi_{eff}(x,y)$. Specific values of the parameters $n_T$, $d_T$, $n_I$, $d_I$, and $n_F$ can be determined based on any necessary, desirable, or suitable value of a given performance parameter. Examples can include selection based on, e.g.: a non-weighted average of the performance parameter calculated over the entire optical element, over only a selected portion thereof, or at one or more discrete sample areas at corresponding transverse positions (e.g., along a beam propagation axis); or a weighted average of the performance parameter calculated over the entire optical element, over only a selected portion thereof, or at one or more discrete sample areas at corresponding transverse positions, using any suitable weighting function (e.g., weighted by local fractional area of recessed areal regions 103 or non-recessed areal regions 107, weighted by expected local optical intensity of the incident optical signal 99, or weighted by another suitable weighting function).

In some examples (e.g., as in FIGS. 1A-1F), each recessed areal region 103 is substantially filled with, and each non-recessed areal region 107 (and the corresponding areal portion of the topmost layer 30 thereof) is covered by and in contact with, the fill medium 70. In the examples of FIGS. 1A, 1C, and 1E, the recessed regions 103 are of substantially uniform depth; In the examples of FIGS. 1B, 1D, and 1F, transversely larger recessed regions 103 are of substantially uniform, maximal depth for a given etch process, while transversely smaller recessed regions 103 exhibit depths that decrease from that maximal depth with decreasing transverse size (as described above). In the examples of FIGS. 1A-1F the fill medium 70 is of indeterminate thickness, and the substrate 10 is substantially transparent over the operational wavelength range, is characterized by a refractive index $n_S$, and is of indeterminate thickness. The optical element is structurally arranged so as to receive on at least a portion of the contiguous multitude of areal regions 103 and 107 the incident optical signal 99, and to transmit the phase-transformed optical signal 97. The same effective phase transformation $\varphi_{eff}(x,y)$ is effected by single-pass transmission through the phase-transforming layer 100 at normal incidence regardless of propagation direction, i.e., regardless of which one of the incident optical signal 99 or the phase-transformed optical signal 97 propagates through the substrate 10. At non-normal incidence, the transmissive optical element can be used in either propagation direction (or both), although refraction can cause the effective phase transformation function for propagation in one direction to differ somewhat from the effective phase transformation function for propagation in the opposite direction. Both propagation directions are represented among the examples of FIGS. 1A-1F.

For the purposes of the present description and appended claims, a substrate, layer, or medium that is of "indeterminate thickness" has a thickness that is large enough to have no effect, or only a functionally negligible effect, on the optical behavior of the optical element. Such an indeterminate thickness typically is at least tens or hundreds (or more) times larger than the design wavelength $\lambda_0$ (e.g., tens or hundreds of microns or more for a design wavelength in the visible or near infrared spectral region), and consequently has no effect, or only a functionally negligible effect, on the optical behavior of the optical element. Such an indeterminate thickness often is macroscopically large, e.g., one or a few millimeters or more, or any suitable larger distance (e.g., centimeters, meters, or larger). As a practical matter, the far surface of such an indeterminately thick substrate, layer, or medium (i.e., the surface that does not face the phase-transforming layer 100 with its recessed and non-recessed areal regions 103 and 107) can be treated as if it were infinitely far away, and therefore can be ignored. Such treatment is particularly apt in examples wherein the fill medium 70 is ambient vacuum, gas, or liquid, but is also applicable for the solid substrate 10, or a fill medium 70 that comprises a solid encapsulant, that is much thicker than any of the layers that make up the phase-transforming layer 100. Accordingly, those "far surfaces" are not shown in the drawings.

In contrast, optical performance of the optical element, including the effective phase transformation $\varphi_{eff}(x,y)$ imparted onto the phase-transformed optical signal 97 as well as other optical properties mentioned above (e.g., reflectivity, polarization dependence, birefringence, and so forth) depend sensitively on the refractive indices and layer thicknesses. In an inventive optical element, the thicknesses $d_I$ and $d_T$ of the intermediate and topmost layers 20 and 30 (and thickness d B of a bottom layer 40, if present) are less than, or on the order of, the design wavelength $\lambda_0$ (e.g., thicknesses of tens or hundreds of nanometers for a design wavelength in the visible or near infrared spectral region).

The specific values of those thicknesses (and the specific values of the corresponding refractive indices $n_I$ and $n_T$, the refractive index $n_B$ of the bottom layer 40 (if present), the refractive index $n_F$ of the fill medium 30, and in some examples the refractive index $n_S$ of the substrate 10) determine the optical behavior of the optical element.

In the examples of FIGS. 1A and 1B, the intermediate layer 20 is formed directly on the top substrate surface 15, and the top substrate surface 15 is in contact with the fill medium 70 in each recessed areal region 103 that extends entirely through the intermediate layer 20. In the example of FIG. 1A, at normal incidence, the local phase delay of the recessed areal regions 103 can be approximated by $\varphi_R \approx (2\pi/\lambda) \cdot (n_F \cdot (d_T+d_I)$ and the local phase delay of the non-recessed areal regions 107 can be approximated by $\varphi_{NR} \approx (2\pi/\lambda) \cdot (n_T \cdot d_T + n_I \cdot d_I)$. In the example of FIG. 1B, at normal incidence, the local phase delay of the recessed areal regions 103 can instead be approximated by $\varphi_R \approx (2\pi/\lambda) \cdot (n_F \cdot D + n_I \cdot (d_T+d_I-D))$ where D is the depth of a given recessed region 103. The depth D: (i) varies among smaller recessed regions 103 with $d_T \leq D \leq d_T+d_I$ and (ii) is about equal to $d_T+d_I$ uniformly among larger recessed regions 103. Those expressions for the phase delay can be suitably modified to account for non-normal incidence as described above. In examples arranged as in FIGS. 1A and 1B, $n_S$ typically, but not necessarily, differs from $n_I$. The refractive indices $n_T$, $n_I$, $n_F$, and $n_S$, the thicknesses $d_T$ and $d_I$, and the sizes and arrangement of the recessed and non-recessed areal regions 103 and 107 are selected (by calculation, simulation, iterative procedure, or other suitable way) to result in the desired effective phase transformation $\varphi_{eff}(x,y)$ and in some instances one or more desired or improved optical performance parameters, e.g., reduced reflectivity, increased throughput, increased focusing efficiency, or other. In examples arranged as in FIG. 1B, the variation (known or measured for a given spatially selective processing method) of the depth D with transverse size of the recessed regions 103 is accounted for in the selection of those parameters (as described above).

In one example of a method for fabricating the example embodiments of FIG. 1A or 1B, a substrate 10 is provided with continuous intermediate and topmost layers 20 and 30 of respective thicknesses $d_I$ and $d_T$. Such a layered substrate can be formed in any suitable way (e.g., growth, deposition, oxidation, and so forth), or obtained commercially from a foundry or other vendor. The recessed areal regions 103 are formed by spatially selectively etching entirely through the intermediate and topmost layer 20 and 30 to expose the top surface 15 of the substrate 10 (only partly through the intermediate layer 20 in some transversely smaller recessed regions 103 in the example of FIG. 1B), while leaving in place areal portions of the intermediate and topmost layers 20 and 30 to form the non-recessed areal regions 107. Any suitable spatially selective etch process can be employed (e.g., masked, direct-write, wet etch, dry etch, and so forth). Alternatively, though less commonly, spatially selective deposition of first the intermediate layer 20 (thickness dr) and then the topmost layer 30 (thickness dr), onto the top surface 15 of the substrate 10, can be employed to form the non-recessed areal regions 107, leaving exposed the top substrate surface 15 in the recessed areal regions 103 that extend entirely through the intermediate layer 20. Any spatially selective deposition process can be employed (e.g., masked, direct-write, vapor deposition, beam deposition, and so forth). Side surfaces of the non-recessed areal regions 107 can be substantially vertical, or can be non-vertical (i.e., inclined or undercut); the examples in the drawings all have vertical side walls, but non-vertical side walls can occur depending on the etch or deposition process(es) that are employed.

If an etch process is employed, process control and timing can be employed to stop the etch process upon reaching the surface 15 of the substrate 10 (as discussed above). Alternatively, a material for the substrate 10 can be chosen that exhibits an etch rate smaller than an etch rate exhibited by the material of the intermediate layer 20, or negligibly small. Such a differential etch rate relaxes process control requirements, because the top substrate surface 15 acts as an etch stop and reduces or eliminates the need for precise timing of the etch, provided that the etch time is sufficiently long to etch entirely through the topmost layer 30 and then the intermediate layer 20 (in at least transversely larger recessed regions 103).

After the recessed and non-recessed areal regions 103 and 107 are formed, the recessed areal regions 103 are filled with, and the non-recessed areal regions 107 are covered by, the fill medium 70. The fill medium 70 is in contact with the top surface 15 of the substrate 10 at the bottom of each recessed region 103 that extends entirely through the intermediate layer 20, with the topmost layer 30 at the top of each non-recessed region 107, and with the intermediate layer 20 at the side surfaces of non-recessed areal regions 107. If the fill medium 70 is vacuum, gas, or liquid, the substrate 10 with the phase-transforming layer 100 formed thereon is simply immersed in the fill medium 70. If a solid fill medium 70 is employed, then the fabrication method further includes encapsulation of the recessed and non-recessed areal regions 103 and 107 with the fill medium 70 using any suitable process, e.g., vapor deposition, or application and curing of a liquid or semi-liquid encapsulant precursor.

In the examples of FIGS. 1C through 1F, the phase-transforming layer 100 of the optical element further comprises a bottom layer 40 that is formed directly on the substrate top surface 15. The intermediate layer 20 is formed directly on the bottom layer 40. The bottom layer 40 is characterized by a refractive index $n_B$ and a thickness $d_B$, and $n_I \neq n_B \neq n_F$.

In the examples of FIGS. 1C and 1D, each non-recessed areal region 107 of the multitude comprises corresponding areal portions of the bottom, intermediate, and topmost layers 40, 20, and 30. Each recessed areal region 103 of the multitude extends entirely through the topmost layer 20 and at least partly through the intermediate layer 30; the multitude of recessed areal regions 103 includes a non-empty subset of recessed areal regions 103 that extend entirely through the topmost, intermediate, and bottom layers 30, 20, and 40. Each recessed areal region 103 is substantially filled with, and each non-recessed areal region 107 (and the corresponding areal portion of the topmost layer 30 thereof) is covered by and in contact with, the fill medium 70. The top substrate surface 15 is in contact with the fill medium 70 in each recessed areal region 103 that extends entirely through the intermediate layer 20 and the bottom layer 40. The substrate 10 and the fill medium 70 are of indeterminate thickness.

In the example of FIG. 1C, at normal incidence, the local phase delay of the recessed areal regions 103 can be approximated by $\varphi_R \approx (2\pi/\lambda) \cdot (n_F \cdot (d_T+d_I+d_B))$ and the local phase delay of the non-recessed areal regions 107 can be approximated by $\varphi_{NR} \approx (2\pi/\lambda) \cdot (n_T \cdot d_T + n_I \cdot d_I + n_B \cdot d_B)$. In the example of FIG. 1D, at normal incidence, the local phase delay of the recessed areal regions 103 can instead be approximated by $\varphi_R \approx (2\pi/\lambda) \cdot (n_F \cdot D + n_I \cdot (d_T+d_I-D) + n_B \cdot d_B)$ in recessed regions 103 where the depth does not reach the bottom layer 40, or by $\varphi_R \approx (2\pi/\lambda) \cdot (n_F \cdot D + n_B \cdot (d_T + d_I + d_B - D))$ in regions 103 where the depth reaches into the bottom layer 40. The depth D: (i) varies among smaller recessed regions 103 with $d_T \leq D \leq d_T + d_I$ or with $d_T + d_I + d_B$ depending on whether or not the depth reaches the bottom layer 40 in a given recessed region 103), and (ii) is about equal to $d_T + d_I + d_B$ uniformly among larger recessed regions 103. Those expressions for the phase delay can be suitably modified to account for non-normal incidence as described above. The refractive index $n_S$ typically, but not necessarily, differs from $n_B$. The refractive indices $n_T$, $n_I$, $n_B$, $n_F$, and $n_S$, the thicknesses $d_T$, $d_I$, and $d_B$, and the sizes and arrangement of the recessed and non-recessed areal regions 103 and 107 are selected (by calculation, simulation, iterative procedure, or other suitable way) to result in the desired effective phase transformation $\varphi_{eff}(x,y)$ and in some instances one or more desired or improved optical performance parameters (such as those described above). In examples arranged as in FIG. 1D, the variation (known or measured for a given spatially selective processing method) of the depth D with transverse size of the recessed regions 103 is accounted for in the selection of those parameters (as described above). The presence of the bottom layer 40 adds two additional adjustable parameters ($n_B$ and $d_B$) that can be varied to achieve the desired phase transformation $\varphi_{eff}(x,y)$ and also in some instances the improved performance parameter(s).

Fabrication of an optical device arranged as in FIG. 1C or 1D can proceed in a manner similar to methods described above. In some examples, a substrate 10 having continuous bottom, intermediate, and topmost layers 40, 20, and 30 is etched entirely through all three of those layers to form the recessed areal regions 103 and expose the top substrate surface 15 (only partly through the intermediate layer 20, or only partly through the bottom layer 40, in some transversely smaller recessed regions 103 in the example of FIG. 1D), while leaving in place areal portions of the bottom, intermediate, and topmost layers 40, 20, and 30 to form the non-recessed areal regions 107. Any suitable etch process(es) can be employed, including those mentioned elsewhere herein. In some examples the material of the substrate 10 can exhibit an etch rate smaller than an etch rate exhibited by the material of the bottom layer 40 (or negligibly small) and so act as an etch stop as described above. In other examples, the bottom, intermediate, and topmost layers 40, 20, and 30 are spatially selectively deposited on the top surface 15 of the substrate 10 to form the non-recessed areal regions 107 while leaving the top substrate surface 15 exposed in the recessed areal regions 103 that extend entirely through the topmost, intermediate, and bottom layers 30, 20, and 40. Any suitable deposition process(es) can be employed, including those mentioned elsewhere herein.

In the examples of FIGS. 1E and 1F, each non-recessed areal region 107 of the multitude comprises corresponding areal portions of the intermediate and topmost layers 20 and 30. Each recessed areal region 103 of the multitude extends entirely through the topmost layer 30 and at least partly through the intermediate layer 20; the multitude of recessed areal regions 103 includes a non-empty subset of recessed areal regions 103 that extend entirely through the topmost layer 30 and the intermediate layer 30, but not through the bottom layer 40. Each recessed areal region 103 is substantially filled with, and each non-recessed areal region 107 (and the corresponding areal portion of the topmost layer 30 thereof) is covered by and in contact with, the fill medium 70. The bottom layer 40 is in contact with the fill medium 70 in each recessed areal region 103 that extends entirely through the intermediate layer 20. The substrate 10 and the fill medium 70 are of indeterminate thickness.

In the example of FIG. 1E, at normal incidence, the local phase delay of the recessed areal regions 103 can be approximated by $\varphi_R \approx (2\pi/\lambda) \cdot (n_F \cdot (d_T + d_I))$ and the local phase delay of the non-recessed areal regions 107 can be approximated by $\varphi_{NR} \approx (2\pi/\lambda) \cdot (n_T \cdot d_T + n_I \cdot d_I)$. In the example of FIG. 1F, at normal incidence, the local phase delay of the recessed areal regions 103 can instead be approximated by $\varphi_R \approx (2\pi/\lambda) \cdot (n_F \cdot D + n_I \cdot (d_T + d_I - D))$. The depth D: (i) varies among smaller recessed regions 103 with $d_T \leq D \leq d_T + d_I$ and (ii) is about equal to $d_T + d_I$ uniformly among larger recessed regions 103. Those expressions for the phase delay can be suitably modified to account for non-normal incidence as described above. The refractive index $n_S$ typically, but not necessarily, differs from $n_B$. The refractive indices $n_T$, $n_I$, $n_B$, $n_F$, and $n_S$, the thicknesses $d_T$, $d_I$, and $d_B$, and the sizes and arrangement of the recessed and non-recessed areal regions 103 and 107 are selected (by calculation, simulation, iterative procedure, or other suitable way) to result in the desired effective phase transformation $\varphi_{eff}(x,y)$ and in some instances one or more desired or improved optical performance parameters (as described above). In examples arranged as in FIG. 1F, the variation (known or measured for a given spatially selective processing method) of the depth D with transverse size of the recessed regions 103 is accounted for in the selection of those parameters (as described above). Note that in the examples of FIGS. 1E and 1F the phase delays do not depend on the index $n_B$ or the thickness $d_B$, because the bottom layer 40 is present in both recessed and non-recessed regions 103 and 107; however, those parameters are included for enabling improvement or optimization of other performance parameters. The presence of the bottom layer 40 adds two additional adjustable parameters ($n_B$ and $d_B$) that can be varied to achieve the improved performance parameter(s) for the optical element, in addition to achieving the desired phase transformation $\varphi_{eff}(x,y)$.

Fabrication of an optical device arranged as in FIG. 1E or 1F can proceed in a manner similar to methods described above. In some examples, a substrate 10 having continuous bottom, intermediate, and topmost layers 40, 20, and 30 is etched entirely through only the topmost and intermediate layers 30 and 20 to form the recessed areal regions 103 and expose the bottom layer 40 (only partly through the intermediate layer 20 in some transversely smaller recessed regions 103 in the example of FIG. 1F), while leaving in place areal portions of the intermediate and topmost layers 20 and 30 to form the non-recessed areal regions 107. Any suitable etch process(es) can be employed, including those mentioned elsewhere herein. In some examples the material of the bottom layer 40 can exhibit an etch rate smaller than an etch rate exhibited by the material of the intermediate layer 20 (or negligibly small) and so act as an etch stop as described above. In other examples, the intermediate and topmost layers 20 and 30 are spatially selectively deposited, on a continuous bottom layer 40 on the substrate 10, to form the non-recessed areal regions 107 while leaving the bottom layer 40 exposed in the recessed areal regions 103 that extend entirely through the intermediate layer 20. Any suitable deposition process(es) can be employed, including those mentioned elsewhere herein.

In some examples (e.g., as in FIGS. 2A-2F), the optical element includes a reflector 50 formed on the top substrate surface 15 between the substrate 10 and the intermediate layer 20. Each recessed areal region 103 is substantially filled with, and each non-recessed areal region 107 (and the corresponding areal portion of the topmost layer 30 thereof)

is covered by and in contact with, the fill medium 70, which is of indeterminate thickness. The optical element is structurally arranged so as to receive on at least a portion of the contiguous multitude of areal regions 103 and 107 the incident optical signal 99 propagating through the fill medium 70, and to reflect the phase-transformed optical signal 97 to propagate through the fill medium 70. The effective phase transformation $\varphi_{eff}(x,y)$ is effected by double-pass transmission through the phase-transforming layer 100 with an intervening reflection by the reflector 50. In the examples of FIGS. 2A-2F, optical properties of the substrate 10 have no effect on the performance of the optical element; the substrate 10 serves as only a mechanical support for the reflector 50 and the phase-transforming layer 100. In such embodiments the substrate 10 can be, but need not be, substantially transparent over some or all of the operational wavelength range.

The reflector can be of any suitable type and can comprise any one or more suitable materials. In some examples the reflector comprises a metallic layer, e.g., a layer of gold, silver, or aluminum. In other examples, the reflector can comprise a dielectric multilayer structure (also referred to as a so-called dielectric stack), with layers thereof arranged to act as the reflector 50. Other suitable reflectors can be employed. Any one or more suitable deposition or growth techniques can be employed to form the reflector 50 on the substrate 10, or the substrate 10 with the reflector 50 already formed thereon can be obtained commercially from a foundry or other vendor.

In the examples of FIGS. 2A and 2B, the intermediate layer 20 is formed directly on the reflector 50, and the reflector 50 is in contact with the fill medium 70 in each recessed areal region 103 that extends entirely through the intermediate layer 20. In the example of FIG. 2A, at normal incidence, the local phase delay of the recessed areal regions 103 can be approximated by (PR $(4\pi/\lambda)\cdot(n_F\cdot(d_T+d_I))$ and the local phase delay of the non-recessed areal regions 107 can be approximated by $\varphi_{NR}\approx(4\pi/\lambda)\cdot(n_T\cdot d_T+n_I\cdot d_I)$. In the example of FIG. 2B, at normal incidence, the local phase delay of the recessed areal regions 103 can instead be approximated by $\varphi_R\approx(4\pi/\lambda)\cdot(n_F\cdot D+n_I(d_T+d_I-D))$. The depth D: (i) varies among smaller recessed regions 103 with $d_T \leq D \leq d_T+d_I$ and (ii) is about equal to $d_T+d_I$ uniformly among larger recessed regions 103. Those expressions for the phase delay can be suitably modified to account for non-normal incidence as described above. Note the additional factor of two relative to the transmissive examples of FIGS. 1A and 1B, which arises from the double-pass geometry. The refractive indices $n_T$, $n_I$, and $n_F$, the thicknesses $d_T$ and $d_I$, and the sizes and arrangement of the recessed and non-recessed areal regions 103 and 107 are selected (by calculation, simulation, iterative procedure, or other suitable way) to result in the desired effective phase transformation $\varphi_{eff}(x,y)$ and in some instances one or more desired or improved optical performance parameters (such as those described above). In examples arranged as in FIG. 2B, the variation (known or measured for a given spatially selective processing method) of the depth D with transverse size of the recessed regions 103 is accounted for in the selection of those parameters (as described above).

In one example of a method for fabricating the example embodiments of FIG. 2A or 2B, a substrate 10 is provided with the reflector 50 and with continuous intermediate and topmost layers 20 and 30 of respective thicknesses $d_I$ and $d_T$. Such a layered substrate can be formed in any suitable way (e.g., growth, deposition, oxidation, and so forth), or obtained commercially from a foundry or other vendor. The recessed areal regions 103 are formed by spatially selectively etching entirely through the intermediate and topmost layer 20 and 30 to expose the reflector 50 (only partly through the intermediate layer 20 in some transversely smaller recessed regions 103 in the example of FIG. 2B), leaving in place areal portions of the intermediate and topmost layers 20 and 30 to form the non-recessed areal regions 107. Any suitable spatially selective etch process can be employed (e.g., masked, direct-write, wet etch, dry etch, and so forth). Alternatively, though less commonly, spatially selective deposition of first the intermediate layer 20 (thickness dr) and then the topmost layer 30 (thickness $d_T$), onto the reflector 50, can be employed to form the non-recessed areal regions 107, leaving exposed the reflector 50 in the recessed areal regions 103 that extend entirely through the intermediate layer 20. Any spatially selective deposition process can be employed (e.g., masked, direct-write, vapor deposition, beam deposition, and so forth). Side surfaces of the non-recessed areal regions 107 can be substantially vertical, or can be non-vertical (i.e., inclined or undercut); the examples in the drawings all have vertical side walls, but non-vertical side walls can occur depending on the etch or deposition process(es) that are employed.

If an etch process is employed, process control and timing can be employed to stop the etch process upon reaching the reflector 50 (as described above). Alternatively, a material for the reflector 50 can be chosen that exhibits an etch rate smaller than an etch rate exhibited by the material of the intermediate layer 20 (or negligibly small) and so act as an etch stop as described above.

After the recessed and non-recessed areal regions 103 and 107 are formed, the recessed areal regions 103 are filled with, and the non-recessed areal regions 107 are covered by, the fill medium 70. The fill medium 70 is in contact with the reflector 50 at the bottom of each recessed region 103 that extends entirely through the intermediate layer 20, with the topmost layer 30 at the top of each non-recessed region 107, and with the intermediate layer 20 at the side surfaces of non-recessed areal regions 107. If the fill medium 70 is vacuum, gas, or liquid, the substrate 10 with the reflector 50 and the phase-transforming layer 100 formed thereon is simply immersed in the fill medium 70. If a solid fill medium 70 is employed, then the fabrication method further includes encapsulation of the recessed and non-recessed areal regions 103 and 107 with the fill medium 70 using any suitable process (such as those described above).

In the examples of FIGS. 2C-2F, the phase-transforming layer 100 of the optical element further comprises a bottom layer 40 that is formed directly on the reflector 50. The intermediate layer 20 is formed directly on the bottom layer 40. The bottom layer 40 is characterized by a refractive index $n_B$ and a thickness $d_B$, and $n_I \neq n_B \neq n_F$.

Figure 2D:
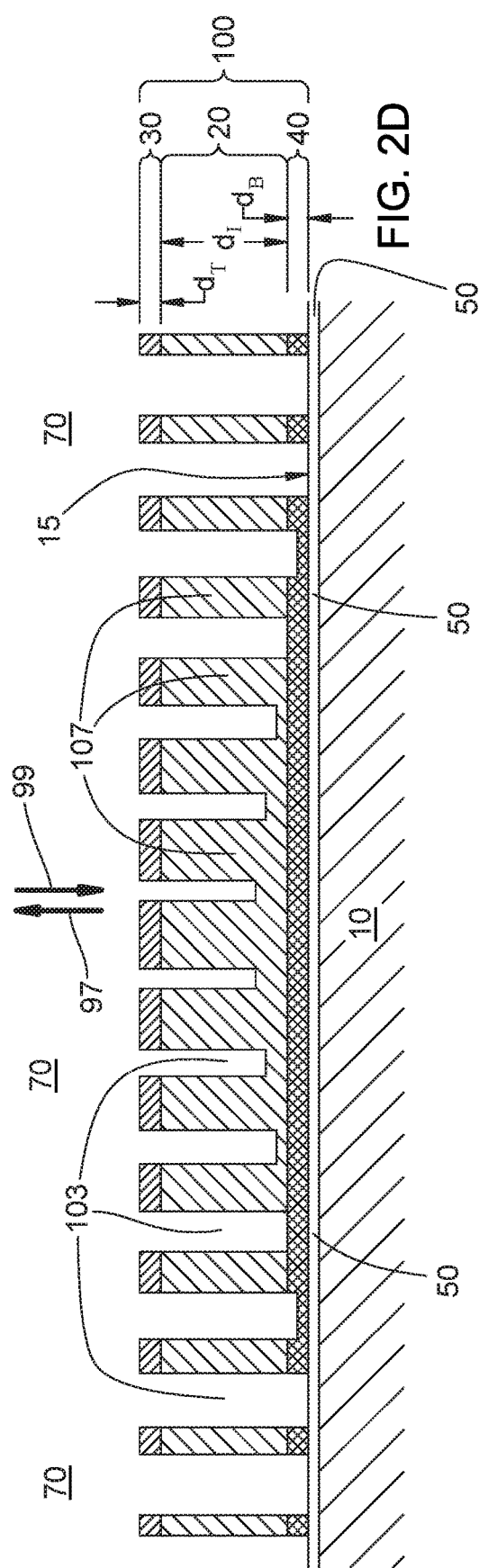

In the examples of FIGS. 2C and 2D, each non-recessed areal region 107 of the multitude comprises corresponding areal portions of the bottom, intermediate, and topmost layers 40, 20, and 30. Each recessed areal region 103 of the multitude extends entirely through the topmost layer 20 and at least partly through the intermediate layer 30; the multitude of recessed areal regions 103 includes a non-empty subset of recessed areal regions 103 that extend entirely through the topmost, intermediate, and bottom layers 30, 20, and 40. Each recessed areal region 103 is substantially filled with, and each non-recessed areal region 107 (and the corresponding areal portion of the topmost layer 30 thereof) is covered by and in contact with, the fill medium 70. The reflector 50 is in contact with the fill medium 70 in each recessed areal region 103 that extends entirely through the intermediate layer 20 and the bottom layer 40; the fill medium 70 is of indeterminate thickness.

In the example of FIG. 2C, at normal incidence and accounting for the double-pass geometry, the local phase delay of the recessed areal regions 103 can be approximated by $\varphi_R \approx (4\pi/\lambda)\cdot(n_F\cdot(d_T+d_I+d_B))$ and the local phase delay of the non-recessed areal regions 107 can be approximated by $\varphi_{NR} \approx (4\pi/\lambda)\cdot(n_T\cdot d_T+n_I\cdot d_I+n_B\cdot d_B)$. In the example of FIG. 2D, at normal incidence, the local phase delay of the recessed areal regions 103 can instead be approximated by $\varphi_R \approx (4\pi/\lambda)\cdot(n_F\cdot D+n_I\cdot(d_T+d_I-D)+n_B\cdot d_B)$ in recessed regions 103 wherein the depth does not reach the bottom layer 40, or $\varphi_R \approx (4\pi/\lambda)\cdot(n_F\cdot D+n_B\cdot(d_T+d_I+d_B-D))$ with $d_T+d_I \leq D \leq d_T+d_I+d_B$ in regions 103 where the depth reaches into the bottom layer 40. The depth D: (i) varies among smaller recessed regions 103 with $d_T \leq D \leq d_T+d_I$ or with $d_T+d_I \leq D \leq d_T+d_I+d_B$ (depending on whether or not the depth reaches the bottom layer 40 in a given recessed region 103), and (ii) is about equal to $d_T+d_I+d_B$ uniformly among larger recessed regions 103. Those expressions for the phase delay can be suitably modified to account for non-normal incidence as described above. The refractive indices $n_T$, $n_I$, $n_B$, and $n_F$, the thicknesses $d_T$, $d_I$, and $d_B$, and the sizes and arrangement of the recessed and non-recessed areal regions 103 and 107 are selected (by calculation, simulation, iterative procedure, or other suitable way) to result in the desired effective phase transformation $\varphi_{eff}(x,y)$ and in some instances one or more desired or improved optical performance parameters (such as those described above). In examples arranged as in FIG. 2D, the variation (known or measured for a given spatially selective processing method) of the depth D with transverse size of the recessed regions 103 is accounted for in the selection of those parameters (as described above). The presence of the bottom layer 40 adds two additional adjustable parameters ($n_B$ and $d_B$) that can be varied to achieve the desired phase transformation $\varphi_{eff}(x,y)$ and also in some instances the improved performance parameter(s).

Fabrication of an optical device arranged as in FIGS. 2C and 2D can proceed in a manner similar to methods described above. In some examples, a substrate 10 having the reflector 50 and continuous bottom, intermediate, and topmost layers 40, 20, and 30 is etched entirely through all three of those layers to form the recessed areal regions 103 and expose the reflector 50 (only partly through the intermediate layer 20, or only partly through the bottom layer 40, in some transversely smaller recessed regions 103 in the example of FIG. 2D), while leaving in place areal portions of the bottom, intermediate, and topmost layers 40, 20, and 30 to form the non-recessed areal regions 107. Any suitable etch process(es) can be employed, including those mentioned elsewhere herein. In some examples the material of the reflector 50 can exhibit an etch rate smaller than an etch rate exhibited by the material of the bottom layer 40 (or negligibly small) and so act as an etch stop as described above. In other examples, the bottom, intermediate, and topmost layers 40, 20, and 30 are spatially selectively deposited on the reflector 50 to form the non-recessed areal regions 107 while leaving the reflector 50 exposed in the recessed areal regions 103 that extend entirely through the topmost, intermediate, and bottom layers 30, 20, and 40. Any suitable deposition process(es) can be employed, including those mentioned elsewhere herein.

Figure 2E:
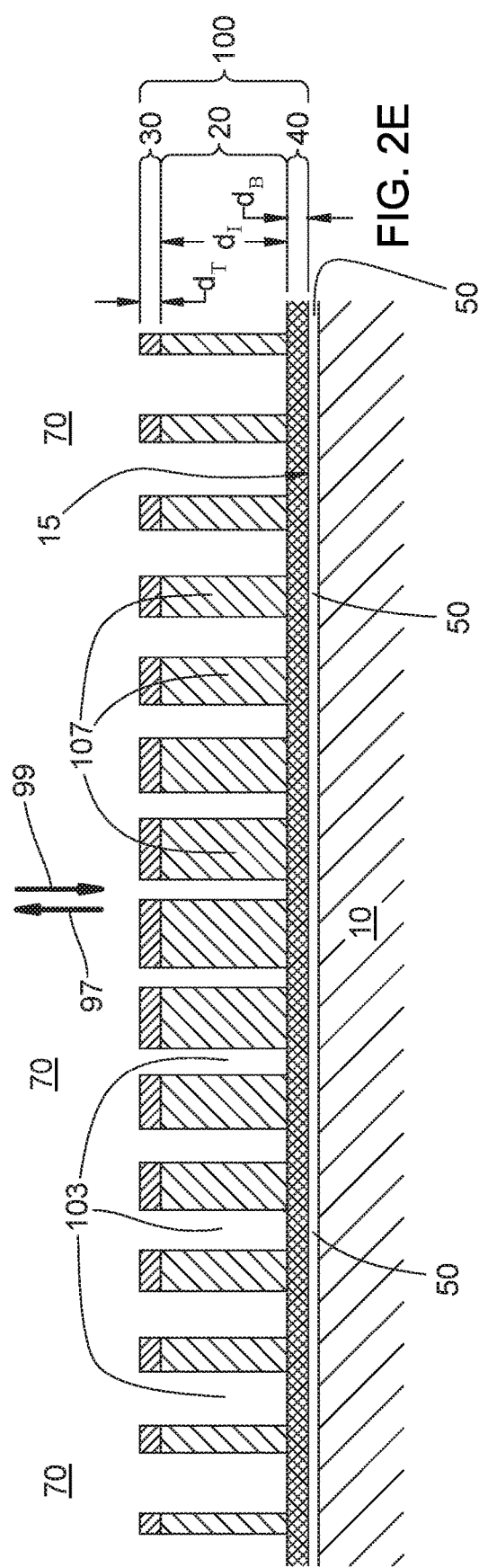
Figure 2F:
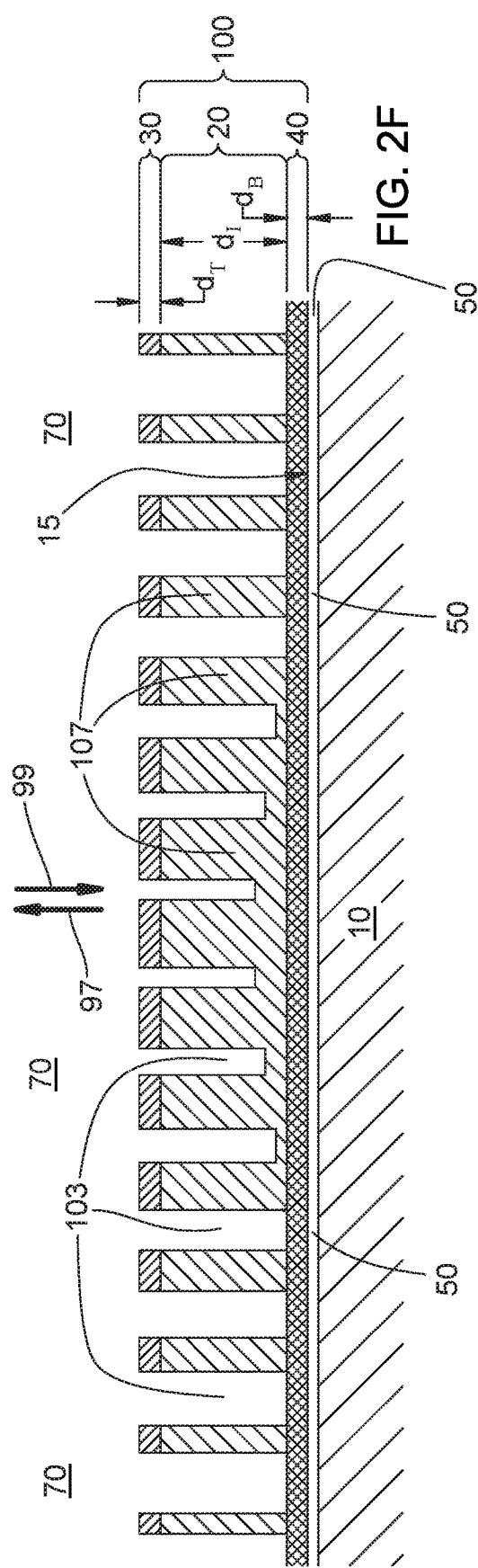

In the examples of FIGS. 2E and 2F, each non-recessed areal region 107 of the multitude comprises corresponding areal portions of the intermediate and topmost layers 20 and 30. Each recessed areal region 103 of the multitude extends entirely through the topmost layer 20 and at least partly through the intermediate layer 30; the multitude of recessed areal regions 103 includes a non-empty subset of recessed areal regions 103 that extend entirely through the topmost and intermediate layers 30 and 20, but not through the bottom layer 40. Each recessed areal region 103 is substantially filled with, and each non-recessed areal region 107 (and the corresponding areal portion of the topmost layer 30 thereof) is covered by and in contact with, the fill medium 70. The bottom layer 40 is in contact with the fill medium 70 in each recessed areal region 103 that extends entirely through the intermediate layer 20. The fill medium 70 is of indeterminate thickness.

In the example of FIG. 2E, at normal incidence and accounting for the double-pass geometry, the local phase delay of the recessed areal regions 103 can be approximated by $\varphi_R \approx (4\pi/\lambda)\cdot(n_F\cdot(d_T+d_I))$ and the local phase delay of the non-recessed areal regions 107 can be approximated by $\varphi_{NR} \approx (4\pi/\lambda)\cdot(n_T\cdot d_T+n_I\cdot d_I)$. In the example of FIG. 2F, at normal incidence, the local phase delay of the recessed areal regions 103 can instead be approximated by $\varphi_R \approx (4\pi/\lambda)\cdot(n_F\cdot D+n_I\cdot(d_T+d_I-D))$. The depth D: (i) varies among smaller recessed regions 103 with $d_T \leq D \leq d_T+d_I$ and (ii) is about equal to $d_T+d_I$ uniformly among larger recessed regions 103. Those expressions for the phase delay can be suitably modified to account for non-normal incidence as described above. The refractive indices $n_B$, $n_I$, $n_B$, and $n_F$, the thicknesses $d_T$, $d_I$, and $d_B$, and the sizes and arrangement of the recessed and non-recessed areal regions 103 and 107 are selected (by calculation, simulation, iterative procedure, or other suitable way) to result in the desired effective phase transformation $\varphi_{eff}(x,y)$ and in some instances one or more desired or improved optical performance parameters (as described above). In examples arranged as in FIG. 2F, the variation (known or measured for a given spatially selective processing method) of the depth D with transverse size of the recessed regions 103 is accounted for in the selection of those parameters (as described above). Note that in the examples of FIGS. 2E and 2F the phase delays do not depend on the index $n_B$ or the thickness $d_B$, because the bottom layer 40 is present in both recessed and non-recessed regions 103 and 107; however, those parameters are included for enabling improvement or optimization of other performance parameters. The presence of the bottom layer 40 adds two additional adjustable parameters ($n_B$ and $d_B$) that can be varied to achieve the improved performance parameter(s) for the optical element, in addition to achieving the desired phase transformation $\varphi_{eff}(x,y)$.

Fabrication of an optical device arranged as in FIG. 2E or 2F can proceed in a manner similar to methods described above. In some examples, a substrate 10 having the reflector 50 and continuous bottom, intermediate, and topmost layers 40, 20, and 30 is etched entirely through only the topmost and intermediate layers 30 and 20 to form the recessed areal regions 103 and expose the bottom layer 40 (only partly through the intermediate layer 20 in some transversely smaller recessed regions 103 in the example of FIG. 2F), while leaving in place areal portions of the intermediate and topmost layers 20 and 30 to form the non-recessed areal regions 107. Any suitable etch process(es) can be employed, including those mentioned elsewhere herein. In some examples the material of the bottom layer 40 can exhibit an etch rate smaller than an etch rate exhibited by the material of the intermediate layer 20 (or negligibly small) and so act as an etch stop as described above. In other examples, the intermediate and topmost layers 20 and 30 are spatially selectively deposited, on a continuous bottom layer 40 on the reflector 50, to form the non-recessed areal regions 107 while leaving the bottom layer 40 exposed in the recessed areal regions 103 that extend entirely through the intermediate layer 20. Any suitable deposition process(es) can be employed, including those mentioned elsewhere herein.

In some examples (e.g., as in FIGS. 3A-3F), the optical element includes a reflector 50 positioned against the topmost layer 30 so as to cover the multitude of recessed and non-recessed areal regions 103 and 107. Each recessed areal region 103 is substantially filled with the fill medium 70, which is also in contact with the reflector 50. In those examples the substrate 10 is substantially transparent over the operational wavelength range, is characterized by a refractive index/is, and is of indeterminate thickness. The optical element is structurally arranged so as to receive on at least a portion of the contiguous multitude of areal regions 103 and 107 the incident optical signal 99 propagating through the substrate 10, and to reflect the phase-transformed optical signal 97 to propagate through the substrate 10. The effective phase transformation $\varphi_{eff}(x,y)$ is effected by double-pass transmission through the phase-transforming layer 100 with an intervening reflection by the reflector 50.

The reflector can be of any suitable type and can comprise any one or more suitable materials, including those described above, and can be formed in any suitable way, including those described above for the examples of FIGS. 1A-1F and 2A-2F. In some examples, the reflector 50 can be formed (e.g., grown or deposited) on the topmost layer 30 of the non-recessed areal regions 107 and on a solid fill medium 70 filling the recessed areal regions 103. Such examples typically would require a solid fill medium 70 and some sort of planarization process, after forming the areal regions 103 and 107 and filling with the fill medium 70, before forming the reflector 50. In other examples, the reflector 50 can be formed on a separate reflector substrate (not shown) and then positioned against the topmost layer 30 of the non-recessed areal regions 107, covering both the recessed and non-recessed areal regions 103 and 107. In such examples the reflector 50 can be retained against the non-recessed areal regions in any suitable way, e.g., by one or more mechanical clamps or retainers, by optical contacting, by diffusion bonding, or by an adhesive. In some examples the fill medium 70 can act as an adhesive, typically in the form a liquid or semiliquid precursor that is then cured to form a solid fill medium and adhesive. Retention of the reflector 50 against the non-recessed areal regions 107 can enable use of vacuum, gas, or liquid as the fill medium 70. In those examples the optical element can be immersed in the fill medium while the reflector 50 is secured in place. In some examples, the reflector 50 already formed on a reflector substrate can be obtained commercially from a foundry or other vendor.

In the examples of FIGS. 3A and 3B, the intermediate layer 20 is formed directly on the top substrate surface 15, and the top substrate surface 15 is in contact with the fill medium 70 in each recessed areal region 103 that extends entirely through the intermediate layer 20. In the example of FIG. 3A, at normal incidence and accounting for the double-pass geometry, the local phase delay of the recessed areal regions 103 can be approximated by $\varphi_R \approx (4\pi/\lambda) \cdot (n_F \cdot (d_T + d_I))$ and the local phase delay of the non-recessed areal regions 107 can be approximated by $\varphi N_R \approx (4\pi/\lambda) \cdot (n_T \cdot d_T + n_I \cdot d_I)$. In the example of FIG. 3B, at normal incidence, the local phase delay of the recessed areal regions 103 can instead be approximated by $\varphi_R \approx (4\pi/\lambda) \cdot (n_F \cdot D + n_I \cdot (d_T + d_I - D))$. The depth D: (i) varies among smaller recessed regions 103 with $d_T \leq D \leq d_T + d_I$ and (ii) is about equal to $d_T + d_I$ uniformly among larger recessed regions 103. Those expressions for the phase delay can be suitably modified to account for non-normal incidence as described above. In examples arranged as in FIGS. 3A and 3B, $n_S$ typically, but not necessarily, differs from $n_I$. The refractive indices $n_T$, $n_I$, $n_F$, and $n_S$, the thicknesses $d_T$ and $d_I$, and the sizes and arrangement of the recessed and non-recessed areal regions 103 and 107 are selected (by calculation, simulation, iterative procedure, or other suitable way) to result in the desired effective phase transformation $\varphi_{eff}(x,y)$ and in some instances one or more desired or improved optical performance parameters (such as those described above). In examples arranged as in FIG. 3B, the variation (known or measured for a given spatially selective processing method) of the depth D with transverse size of the recessed regions 103 is accounted for in the selection of those parameters (as described above).

In the examples of FIGS. 3C-3F, the phase-transforming layer 100 of the optical element further comprises a bottom layer 40 that is formed directly on the substrate top surface 15. The intermediate layer 20 is formed directly on the bottom layer 40. The bottom layer 40 is characterized by a refractive index $n_B$ and a thickness $d_B$, and $n_I \neq n_B \cdot n_F$.

In the examples of FIGS. 3C and 3D, each non-recessed areal region 107 of the multitude comprises corresponding areal portions of the bottom, intermediate, and topmost layers 40, 20, and 30. Each recessed areal region 103 of the multitude extends entirely through the topmost layer 20 and at least partly through the intermediate layer 30; the multitude of recessed areal regions 103 includes a non-empty subset of recessed areal regions 103 that extend entirely through the topmost, intermediate, and bottom layers 30, 20, and 40. Each recessed areal region 103 is substantially filled with the fill medium 70, which is also in contact with the reflector 50 in each recessed areal region 103 and with the top substrate surface 15 in each recessed areal region 103 that extends entirely through the intermediate layer 20 and the bottom layer 40. The substrate 10 is of indeterminate thickness.

In the example of FIG. 3C, at normal incidence and accounting for the double-pass geometry, the local phase delay of the recessed areal regions 103 can be approximated by $\varphi_R \approx (4\pi/\lambda) \cdot (n_F \cdot (d_T + d_I + d_B))$ and the local phase delay of the non-recessed areal regions 107 can be approximated by $\varphi_{NR} (4\pi/\lambda) \cdot (n_T \cdot d_T + n_I \cdot d_I + n_B \cdot d_B)$. In the example of FIG. 3D, at normal incidence, the local phase delay of the recessed areal regions 103 can instead be approximated by $\varphi_R \approx (4\pi/\lambda) \cdot (n_F \cdot D + n_I \cdot (d_T + d_I - D) + n_B \cdot d_B)$ in recessed regions 103 wherein the depth does not reach the bottom layer 40, or $\varphi_R \cdot (4\pi/\lambda) \cdot (n_F \cdot D + n_B \cdot (d_T + d_I + d_B - D))$ with $d_T + d_I \leq D \leq d_T + d_I + d_B$ in regions 103 where the depth reaches into the bottom layer 40. The depth D: (i) varies among smaller recessed regions 103 with $d_T \leq D \leq d_T + d_I$ or with $d_T + d_I \leq D \leq d_T + d_I + d_B$ (depending on whether or not the depth reaches the bottom layer 40 in a given recessed region 103), and (ii) is about equal to $d_T + d_I + d_B$ uniformly among larger recessed regions 103. Those expressions for the phase delay can be suitably modified to account for non-normal incidence as described above. The refractive index $n_S$ typically, but not necessarily, differs from $n_B$. The refractive indices $n_T$, $n_I$, $n_B$, $n_F$, and $n_S$, the thicknesses $d_T$, $d_I$, and $d_B$, and the sizes and arrangement of the recessed and non-recessed areal regions 103 and 107 are selected (by calculation, simulation, iterative procedure, or other suitable way) to result in the desired effective phase transformation $\varphi_{eff}(x,y)$ and in some instances one or more desired or improved optical performance parameters (such as those described above). In examples arranged as in FIG. 3D, the variation (known or measured for a given spatially selective processing method) of the depth D with transverse size of the recessed regions 103 is accounted for in the selection of those parameters (as described above). The presence of the bottom layer 40 adds two additional adjustable parameters ($n_B$ and $d_B$) that can be varied to achieve the desired phase transformation $\varphi_{eff}(x,y)$ and also in some instances the improved performance parameter(s).

In the examples of FIGS. 3E and 3F, each non-recessed areal region 107 of the multitude comprises corresponding areal portions of the intermediate and topmost layers 20 and 30. Each recessed areal region 103 of the multitude extends entirely through the topmost layer 20 and at least partly through the intermediate layer 30; the multitude of recessed areal regions 103 includes a non-empty subset of recessed areal regions 103 that extend entirely through the topmost and intermediate layers 30 and 20, but not through the bottom layer 40. Each recessed areal region 103 is substantially filled with the fill medium 70, which is also in contact with the reflector 50 in each recessed region 103 and with the bottom layer 40 in each recessed areal region 103 that extends entirely through the intermediate layer 20. The substrate 10 is of indeterminate thickness.

In the example of FIG. 3E, at normal incidence and accounting for the double-pass geometry, the local phase delay of the recessed areal regions 103 can be approximated by $\varphi_R \approx (4\pi/\lambda) \cdot (n_F \cdot (d_B+d_I))$ and the local phase delay of the non-recessed areal regions 107 can be approximated by $\varphi_{NR} \approx (4\pi/\lambda) \cdot (n_T \cdot d_T + n_I \cdot d_I)$. In the example of FIG. 3F, at normal incidence, the local phase delay of the recessed areal regions 103 can instead be approximated by $\varphi_R \approx (4\pi/\lambda) \cdot (n_F \cdot D + n_I \cdot (d_I + d_T - D))$. The depth D: (i) varies among smaller recessed regions 103 with $d_T \leq D \leq d_T + d_I$ and (ii) is about equal to $d_T + d_I$ uniformly among larger recessed regions 103. Those expressions for the phase delay can be suitably modified to account for non-normal incidence as described above. The refractive index $n_S$ differs from $n_B$. The refractive indices $n_B$, $n_I$, $n_B$, $n_F$, and $n_S$, the thicknesses $d_T$, $d_I$, and $d_B$, and the sizes and arrangement of the recessed and non-recessed areal regions 103 and 107 are selected (by calculation, simulation, iterative procedure, or other suitable way) to result in the desired effective phase transformation $\varphi_{eff}(x,y)$ and in some instances one or more desired or improved optical performance parameters (as described above). In examples arranged as in FIG. 3F, the variation (known or measured for a given spatially selective processing method) of the depth D with transverse size of the recessed regions 103 is accounted for in the selection of those parameters (as described above). Note that in the examples of FIGS. 3E and 3F the phase delays do not depend on the index $n_B$ or the thickness $d_B$, because the bottom layer 40 is present in both recessed and non-recessed regions 103 and 107; however, those parameters are included for enabling improvement or optimization of other performance parameters. The presence of the bottom layer 40 adds two additional adjustable parameters ($n_B$ and $d_B$) that can be varied to achieve the improved performance parameter(s) for the optical element, in addition to achieving the desired phase transformation $\varphi_{eff}(x,y)$.

Any of the various methods described above for forming the recessed and non-recessed areal regions of any of the examples of FIGS. 1A-1F can be employed to form the recessed and non-recessed areal regions 103 and 107 of the examples of FIGS. 3A-3F, including use of the substrate 10 or the bottom layer 40 (if present) as an etch stop. After the recessed and non-recessed areal regions 103 and 107 are formed, the recessed areal regions 103 can be filled with the fill medium 70 and the reflector 50 can be formed on or positioned against the non-recessed areal regions 107, as described above.

Examples of suitable materials for the substrate 10 include one or more of: doped or undoped silicon; one or more doped or undoped III-V semiconductors or alloys thereof; doped or undoped silicon oxide, nitride, or oxynitride (e.g., $SiO_2$, $SiO_x$, $Si_3N_4$, $SiN_x$, or $SiO_xN_y$; amorphous $SiO_2$ is commonly referred to as silica or fused silica); one or more doped or undoped metal oxides, nitrides, or oxynitrides; one or more optical glasses (e.g., various heavily doped silicas, or mixtures of silica and one or more metal oxides); or one or more doped or undoped polymers. In examples wherein the incident or phase-transformed optical signal propagates through the substrate (e.g., as in FIGS. 1A-1F and 3A-3F), the substrate is substantially transparent over the operational wavelength range; in examples that include a reflector positioned between the intermediate layer and the substrate (e.g., as in FIGS. 2A-2F), the substrate 10 has no effect on optical performance, but acts only as a mechanical support for the phase-transforming layer 100. Examples of suitable materials for the topmost layer 30, the intermediate layer 20, or the bottom layer 40 (if present) include one or more of: doped or undoped silicon; one or more doped or undoped III-V semiconductors or alloys thereof; doped or undoped silicon oxide, nitride, or oxynitride; one or more doped or undoped metal oxides, nitrides, or oxynitrides; one or more optical glasses; one or more doped or undoped polymers, or indium tin oxide. Indium tin oxide can form substantially transparent, electrically conductive films, and in some examples can be advantageously employed to provide electrical functionality for the optical element (e.g., heating, illumination, display control, and so forth). Examples of suitable materials for the fill medium 70 include one or more of: vacuum; one or more of air, nitrogen, noble gas, or other inert gas; one or more optical liquids; doped or undoped silicon; one or more doped or undoped III-V semiconductors or alloys thereof; doped or undoped silicon oxide, nitride, or oxynitride; one or more doped or undoped metal oxides, nitrides, or oxynitrides; one or more optical glasses; or one or more doped or undoped polymers. If the substrate 10, the bottom layer 40 (if present), or the reflector 50 (if present) is intended to act as an etch stop, materials such as silicon oxide (e.g., for an $SF_6$-based process for etching silicon) or hafnia ($HfO_2$) or alumina ($Al_2O_3$) (e.g., for a fluorine-based process for etching silicon) can be advantageously employed.

In any of the disclosed arrangements (single-pass transmission or double-pass transmission with an intervening reflection), the actual phase shift that results and other optical performance parameters, depend on, inter alia, the angle of incidence, the wavelength of the incident optical signal 99, and on the details of the sizes and spatial arrangement of the recessed and non-recessed areal regions 103 and 107 that result from the actual fabrication processes employed. For each of the arrangements described above, approximate expressions were given for $\varphi_R$ and $\varphi_{NR}$, the local phase delay at normal incidence through recessed and non-recessed areal regions 103 and 107, respectively, as functions of the layer thicknesses and refractive indices. Those local phase delays can be suitably modified to account for non-normal incidence as described above. The effective phase function can then be approximated by $\varphi_{eff}(x,y) \approx R(x,y) \cdot \varphi_R + (1-R(x,y)) \cdot \varphi_{NR}$, spatially averaged over a sampling area having transverse dimensions about equal to $\lambda_0$, where the function $R(x,y) \equiv 1$ in a recessed areal region 103 and $R(x,y) \equiv 0$ in a non-recessed areal region 107. Given a desired phase transformation y(x,y) and initial values selected for the refractive indices and layer thicknesses, an initial estimate of the function R(x,y) can be calculated that yields the best estimate of the desired phase transformation (taking into account the variation of depth of recessed regions 103 with transverse size, if needed for a given spatially selective processing scheme or methodology). In many examples, however, an iterative design/fabrication/measurement process can be advantageously employed to find the refractive indices, layer thicknesses, and the function R(x,y) that yield an optical element that provides an effective phase transformation $\varphi_{eff}(x,y)$ that exhibits acceptably small (i.e., operationally acceptable) phase error relative to the designed phase transformation $\varphi(x,y)$, and in some instances also exhibits a desired level of or improvement in one or more optical performance parameters (discussed above). The refractive indices, layer thicknesses, and the functions R(x, y) that result from such an iterative process can differ from those initially calculated based on the desired phase transformation $\varphi(x,y)$.

An example of such an iterative method comprises: (A) specifying the effective phase transformation function $\varphi_{eff}$(x,y); (B) forming an intermediate optical element by spatially selectively processing at least the topmost and intermediate layers 30 and 20 (and in some examples the bottom layer 40, if present) to form the multitude of recessed and non-recessed areal regions 103 and 107, in accordance with an estimated arrangement R(x,y) of the volumes of the multitude; (C) measuring an intermediate phase function $\varphi_{inter}(x,y)$ imparted onto a portion of an incident optical signal transmitted or reflected by the intermediate optical element; (D) altering the estimated arrangement of the areal regions of the multitude in accordance with a difference between $\varphi_{eff}(x,y)$ and $\varphi_{inter}(x,y)$; and (E) repeating steps (B), (C), and (D) using successively altered arrangements of the areal regions of the multitude until the difference between $\varphi_{eff}(x,y)$ and $\varphi_{inter}(x,y)$ is less than a specified allowable phase error, (F) wherein the optical element is the intermediate optical element having the difference between $\varphi_{eff}(x,y)$ and $\varphi_{inter}(x,y)$ that is less than the specified allowable phase error.

Such a method can further include: at step (C), measuring one or more optical performance parameters of the optical element; at step (D), altering one or more layer thicknesses or refractive indices in accordance with a difference between the measured optical performance parameter and a desired level of that parameter; at step (E), repeating those measurements and alterations until the measured optical performance parameter is within an operationally acceptable range of a desired value for that parameter. Suitable parameters for such manipulation or optimization are discussed above.

In a first set of specific illustrative examples arranged as in FIG. 1F, the substrate 10 is fused silica ($n_S$=1.45; about 0.35 mm thick), the bottom layer 40 is aluminum oxide (Al$_2$O$_3$; $n_B$=1.65; $d_B$=160 nm), the intermediate layer 20 is silicon nitride ($n_I$=1.98; $d_I$=1400 nm), and the topmost layer 30 is silicon dioxide (SiO$_2$; $n_T$=1.45; $d_T$=160 nm). The recessed and non-recessed areal regions 103 and 107 are arranged according to a grid pattern with a grid spacing $\Lambda_0$ of 500 nm, and each unit cell includes a single circular post (as in FIG. 7) ranging in diameter from about 250 nm to about 400 nm. In one specific arrangement, the optical element is arranged to function as a diffraction-limited lens with a transverse diameter of 1.5 mm and a focal length of 2.35 mm (NA of about 0.28) at a design wavelength $\lambda_0$ of 940 nm. With an anti-reflection coating provided on the back surface of the substrate 10, the focusing efficiency (i.e., the fraction of input power directed into the diffraction-limited focused spot) of that specific arrangement is about 98%. In other specific arrangements, the optical element can be arranged to act as a lens of a different diameter, focal length, or NA, as a vortex plate, as a vortex lens, as a structured light generator, as a dot generator, as a diffuser, or as some other suitable optical element.

A fluoride-based dry etch chemistry (CF$_4$, CHF$_3$, Ar, and O$_2$ in a reactive ion etching tool with inductively coupled plasma) was used to fabricate this particular example. For posts (non-recessed regions 107) less than about 150 nm in diameter (with intervening recessed regions 103 greater than 350 nm across), the recessed regions 103 extend through the entire thickness (1400 nm) of the intermediate layer 20 (silicon nitride). With increasing post diameter increases (and corresponding decreasing width of intervening recessed regions), the etch depth through the silicon nitride intermediate layer 30 decreases; for 320-nm-diameter posts (with intervening ova recessed regions 180 nm across), the etch depth through the silicon nitride intermediate layer is only about 860 nm. As noted previously herein, different process conditions, or an entirely different etch process, can be employed to yield a different dependence (or no dependence) of etch depth versus transverse size of a recessed region.

In a second set of specific illustrative examples arranged as in FIGS. 1A/1B, the substrate 10 is fused silica ($n_S$=1.45), the intermediate layer 20 is polycrystalline silicon ($n_I$≈3.6; $d_I$=540 nm), and the topmost layer 30 is silicon nitride ($n_T$=1.98; $d_T$=118 nm). The recessed and non-recessed areal regions 103 and 107 are arranged according to a grid pattern with a grid spacing $\Lambda_0$ of about 400 nm, and each unit cell includes a single circular post (as in FIG. 7) ranging in diameter from about 100 nm to about 250 nm in some examples, or from about 125 nm to about 275 nm in other examples. In various specific arrangements, the optical element can be arranged to act as a lens of a selected diameter, focal length, or NA, as a vortex plate, as a vortex lens, or as some other suitable optical element.

In a third set of specific illustrative examples (similar to the second set) arranged as in FIGS. 1A/1B, the substrate 10 is fused silica ($n_S$=1.45), the intermediate layer 20 is polycrystalline silicon ($n_I$≈3.6; $d_I$=580 nm), and the topmost layer 30 is silicon nitride ($n_T$=1.98; $d_T$=118 nm). The recessed and non-recessed areal regions 103 and 107 are arranged according to a grid pattern with a grid spacing $\Lambda_0$ of about 400 nm, and each unit cell includes a single circular post (as in FIG. 7) ranging in diameter from about 100 nm to about 250 nm in some examples, or from about 125 nm to about 275 nm in other examples. In various specific arrangements, the optical element can be arranged to act as a lens of a selected diameter, focal length, or NA, as a vortex plate, as a vortex lens, or as some other suitable optical element.

Any suitable spatial arrangement of the recessed and non-recessed areal regions 103 and 107 can be employed (i.e., the function R(x,y) provided that their various sizes and distribution imparts onto the phase-transformed optical signal 97 the effective phase transformation $\varphi_{eff}(x,y)$. In some examples, the areal regions 103 and 107 can be sized and positioned in an irregular or pseudorandom arrangement.

In other examples the areal regions 103 and 107 of the multitude are arranged according to a regular two-dimensional transverse grid pattern across the optical element, with the grid pattern being characterized by a grid spacing of $\Lambda_0$ between about $\lambda_0/20$ and about $\lambda_0$. Each unit cell of the grid pattern is characterized by a corresponding fractional area $f_R(x,y)$ occupied by one or more portions of one or more recessed areal regions 103, and a corresponding fractional area $1-f_R(x,y)$ occupied by one or more portions of one or more non-recessed areal regions 107, wherein the fractional areas $f_R(x,y)$ differ among the unit cells of the grid pattern. Arrangement according to such a grid pattern can be thought of as analogous to "digitizing" the phase function $\varphi_{eff}(x,y)$ so that the transverse position (x,y) can only assume certain discrete values determined by the grid spacing. The spatial averaging described above arising from the wave nature of the input optical signal 99 "smooths out" the "digitized" approximation and imparts the substantially continuous phase function $\varphi_{eff}(x,y)$ (or an operationally acceptable approximation thereof). Note that for certain spatially selective material processing schemes or methodologies, the effective value of $f_R(x,y)$ for a particular unit cell can be affected (typically reduced) for recessed regions that are transversely small enough to exhibit reduced depth after processing relative to larger recessed regions 103. The necessary correction can be estimated or measured by careful characterization of the spatially selective processing schemes with respect to, e.g., materials to be processed, specific methods employed, specific reagents employed, processing conditions such as pressure or temperature, and so on.

Figures 6, 7:
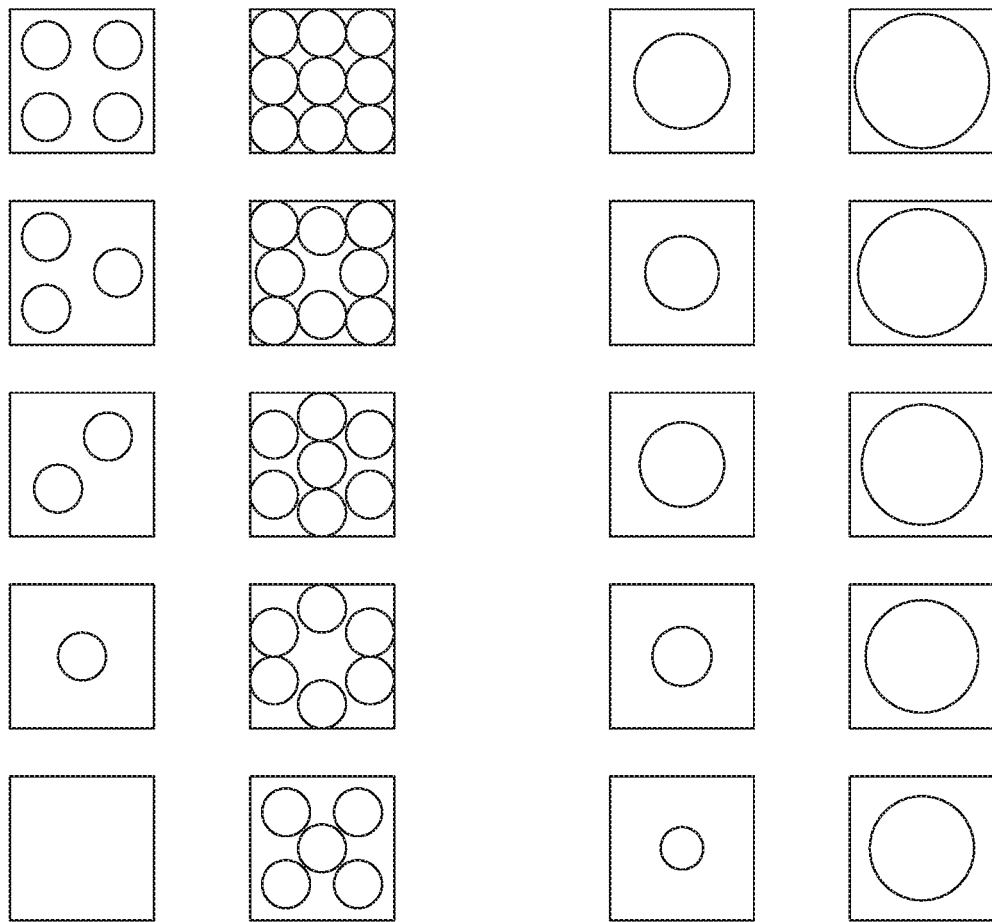
FIGS. 6 and 7 illustrate schematically example arrangements of unit cells of an inventive, phase-transforming optical element.

In some such grid-based examples, (i) each unit cell of a non-empty subset of the grid pattern is arranged as one or more discrete, circumscribed non-recessed areal regions 107 surrounded by a recessed areal region 103 (i.e., circumscribed posts, columns, pillars, or walls surrounded by recessed areas), or (ii) each unit cell of a non-empty subset of the grid pattern is arranged as one or more discrete, circumscribed recessed areal regions 103 surrounded by a non-recessed areal region 107 (i.e., circumscribed holes or trenches surrounded by non-recessed areas). Any given grid-based example must contain at least a subset of unit cells of the post type or at least a subset of unit cells of the hole type; in some examples both types can be present. In some examples each post-type unit cell includes only a single circumscribed non-recessed areal region 107; in some examples each hole-type unit cell includes only a single circumscribed recessed areal region 103. In addition to post-type or hole-type unit cells (or both), some grid-based examples can also include a subset of unit cells that are entirely recessed, a subset of unit cells that are entirely non-recessed, or both. FIG. 6 illustrates schematically several examples of unit cells having no, one, or multiple circumscribed areal regions (posts or holes); FIG. 7 illustrates schematically several examples of unit cells having only a single circumscribed areal region (post or hole).

In some grid-based examples, the multitude of areal regions 103 and 107 can be arranged so that, within each unit cell of the grid pattern, the fractional areas are arranged according to one of a discrete set of predetermined unit arrangements, so that phase delay of the transmitted portion of the optical signal averaged over each unit cell can assume a corresponding value among a set of K preselected discrete values spanning a range greater than about $2\pi(K-1)/K$. The example unit cells of FIG. 6 can be employed in such an arrangement. In such examples the desired phase function $\varphi_{eff}(x,y)$ is approximated by a function that can assume only certain discrete values (analogous to "digitizing" the magnitude of the phase function $\varphi_{eff}(x,y)$, in addition to the effective "digitization" with respect to transverse position described above), but the spatial averaging described above arising from the wave nature of the input optical signal 99 "smooths out" the "digitized" approximation (with respect to both transverse position and magnitude) and imparts the substantially continuous phase function $\varphi_{eff}(x,y)$ (or an operationally acceptable approximation thereof).

In some other grid-based examples, the multitude of areal regions 103 and 107 can be arranged so that, within each unit cell of the grid pattern, the fractional areas are arranged according to one of a continuous set of predetermined unit arrangements, so that phase delay of the transmitted portion of the optical signal averaged over each unit cell can assume a corresponding value among a set of continuously varying values spanning a range greater than about $2\pi$. The example unit cells of FIG. 7 (with continuous variation of the area of the post or hole) can be employed in such an arrangement. There is therefore no effective "digitization" of the magnitude of the phase function $\varphi_{eff}(x,y)$, only the effective "digitization" with respect to transverse position (as described above). The spatial averaging described above arising from the wave nature of the input optical signal 99 "smooths out" the "digitized" approximation (with respect to transverse position) and imparts the substantially continuous phase function $\varphi_{eff}(x,y)$ (or an operationally acceptable approximation thereof).

Unless specific arrangements described herein are mutually exclusive with one another, the various implementations described herein can be combined in whole or in part to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical element comprising:
   a substrate;
   a reflector formed on a top surface of the substrate;
   a bottom layer formed on the reflector;
   an intermediate layer formed over the top surface of the substrate and on the bottom layer, the intermediate layer having a refractive index $n_I$;
   a topmost layer formed directly on the intermediate layer and having a refractive index $n_T$ where $n_T \neq n_I$; and
   a contiguous multitude of recessed and non-recessed areal regions, wherein:
      the intermediate and topmost layers are substantially transparent over an operational wavelength range that includes a design wavelength $\lambda_0$;
      the areal regions of the multitude are variously sized and distributed transversely across the optical element, the multitude of areal regions includes a non-empty subset of areal regions having a largest transverse dimension less than about $\lambda_0$, each non-recessed areal region of the multitude includes corresponding areal portions of the intermediate and topmost layers, each recessed areal region of the multitude extends entirely through the topmost layer and the intermediate layer; and
      each recessed areal region is substantially filled with a fill medium that is substantially transparent over the operational wavelength range, the fill medium having a refractive index $n_F$ where $n_F \neq n_I \neq n_T$.

2. The optical element of claim 1, wherein:
   the optical element is structurally arranged so as to receive on at least a portion of the contiguous multitude of areal regions an incident optical signal, within the operational wavelength range, and to transmit or reflect at least a portion of the incident optical signal as a phase-transformed optical signal that is transformed substantially according to a specified effective phase transformation function $\varphi_{eff}(x,y)$ that varies as a function of transverse two-dimensional position coordinates x and y across the optical element;
   the topmost layer has a substantially uniform thickness $d_T$;
   the intermediate layer has a substantially uniform thickness $d_I$; and
   the refractive indices $n_T$, $n_I$, and $n_F$, the thicknesses $d_T$ and $d_I$, and arrangement of the variously sized and distributed areal regions of the multitude result in the areal regions of the optical element are configured to collectively impart onto the phase-transformed optical signal the effective phase transformation $\varphi_{eff}(x,y)$.

3. The optical element of claim 1, wherein:
   the intermediate layer comprises silicon nitride and the topmost layer comprises silicon dioxide; or
   the intermediate layer comprises polycrystalline silicon and the topmost layer comprises silicon nitride.

4. The optical element of claim 1, wherein the topmost layer provides better impedance matching of the non-recessed areal regions to the fill medium compared to non-recessed areal regions made entirely of a material of the intermediate layer without a material of the topmost layer.

5. The optical element of claim 1, wherein:
   the intermediate layer is formed directly on the top surface of the substrate; and
   the substrate exhibits an etch rate smaller than an etch rate exhibited by the intermediate layer.

6. The optical element of claim 1, wherein
   the intermediate layer is formed directly on the bottom layer; and
   the intermediate layer exhibits an etch rate smaller than an etch rate exhibited by the bottom layer.

7. The optical element of claim 1, wherein:
   the intermediate layer is formed directly on the bottom layer;
   each recessed areal region of the multitude further extends entirely through the bottom layer; and
   the substrate exhibits an etch rate smaller than an etch rate exhibited by the intermediate layer and the bottom layer.

8. The optical element of claim 1, wherein the reflector is formed directly on the top surface of the substrate
   the intermediate layer is formed directly on the bottom layer; and
   the reflector exhibits an etch rate smaller than an etch rate exhibited by the intermediate layer.

9. The optical element of claim 1, wherein:
   the intermediate layer is formed directly on the bottom layer;
   the bottom layer is formed directly on the reflector;
   each recessed areal region of the multitude further extends entirely through the bottom layer; and
   the reflector exhibits an etch rate smaller than an etch rate exhibited by the intermediate layer and the bottom layer.

10. The optical element of claim 1, further comprising a reflector positioned against the topmost layer so as to cover the multitude of recessed and non-recessed areal regions, wherein:
    the substrate is substantially transparent over the operational wavelength range; and
    the optical element is structurally arranged so as to receive on at least a portion of the contiguous multitude of areal regions an incident optical signal propagating through the substrate and to reflect the phase-transformed optical signal to propagate through the substrate.

11. The optical element of claim 1, wherein:
    the topmost layer has a substantially uniform thickness $d_T$;
    the intermediate layer has a substantially uniform thickness $d_I$; and
    $n_T$, $d_T$, $n_I$, $d_I$, $n_F$, and the variously sized and distributed areal regions of the multitude result in one or more improved performance parameters of the optical element, relative to a reference optical element that is arranged so as to impart the effective phase transformation function $\varphi_{eff}(x,y)$ with areal regions variously sized and distributed transversely across the reference optical element in the same transverse arrangement as the optical element and with non-recessed areal regions of the reference optical element that include only a single material.

12. The optical element of claim 11, wherein the one or more improved performance parameters include at least one of:
    reduced or minimized overall reflectivity;
    increased or maximized overall optical throughput;
    increased or maximized focusing efficiency when the optical element is arranged to function as a lens;
    transmissivity;
    polarization dependence;
    linear or circular birefringence; or
    angular dependence.

* * * * *